US012639121B1

(12) United States Patent　　(10) Patent No.:　US 12,639,121 B1
Baquero et al.　　(45) Date of Patent:　May 26, 2026

(54) INTEGRATION AND DEPLOYMENT OF TRADITIONAL MACHINE LEARNING MODELS FOR ARTIFICIAL INTELLIGENCE AGENTS

(71) Applicant: Airia LLC, Alpharetta, GA (US)

(72) Inventors: Juan Baquero, Bogota (CO); Ihor Herasko, Sofia (BG); Anna Medeiros, João Pessoa (BR); Túlio Santana, João Pessoa (BR)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/273,060

(22) Filed: Jul. 17, 2025

(51) Int. Cl.
| | |
|---|---|
| *G06F 9/50* | (2006.01) |
| *G06F 8/65* | (2018.01) |
| *G06F 9/451* | (2018.01) |
| *G06F 21/53* | (2013.01) |
| *G06N 20/00* | (2019.01) |
| *G06F 8/34* | (2018.01) |

(52) U.S. Cl.
CPC .............. G06F 9/5033 (2013.01); G06F 8/65 (2013.01); G06F 9/451 (2018.02); G06F 21/53 (2013.01); G06N 20/00 (2019.01); G06F 8/34 (2013.01)

(58) Field of Classification Search
None
See application file for complete search history.

(56) References Cited

U.S. PATENT DOCUMENTS

| | | | |
|---|---|---|---|
| 12,423,088 B1 * | 9/2025 | Hwang ...................... | G06F 8/65 |
| 2021/0107141 A1 * | 4/2021 | Shrivastava ............. | G06F 8/71 |
| 2021/0391069 A1 * | 12/2021 | Leinfellner ........... | G16H 10/60 |
| 2022/0129787 A1 * | 4/2022 | Vogeti ....................... | G06F 8/60 |
| 2022/0391176 A1 * | 12/2022 | Gupte ..................... | G06F 8/34 |
| 2024/0202600 A1 * | 6/2024 | Poirier .................. | G06N 3/092 |
| 2024/0346365 A1 * | 10/2024 | Hollebrandse ......... | G06N 20/00 |
| 2024/0394869 A1 * | 11/2024 | Yu ........................ | G06F 3/04847 |
| 2025/0005970 A1 * | 1/2025 | Gan ........................ | G07C 5/006 |
| 2025/0045848 A1 * | 2/2025 | Focke .................. | G06Q 10/103 |
| 2025/0139417 A1 * | 5/2025 | Tripathy ................ | G06N 20/00 |
| 2025/0147753 A1 * | 5/2025 | Gul ........................... | G06N 5/04 |
| 2025/0181339 A1 * | 6/2025 | Zaiss ......................... | G06F 8/61 |
| 2025/0238705 A1 * | 7/2025 | Wolf ...................... | G06N 5/025 |

* cited by examiner

*Primary Examiner* — Abu Zar Ghaffari

(74) *Attorney, Agent, or Firm* — Perilla Knox & Hildebrandt LLP; Jason M. Perilla

(57) ABSTRACT

The integration and deployment of machine learning (ML) models in configurable workflows is described. An example method of deployment of an ML model includes receiving a model submission package from a client device, extracting configuration parameters from a manifest file, provisioning a compute environment within the artificial intelligence (AI) platform based on the configuration parameters, instantiating and rendering an agent object within a graphical workflow canvas, and enabling, by the graphical workflow canvas, a user to define an executable workflow comprising the agent object, such that the executable workflow is invoked by the AI platform. The executable workflow can be invoked by the AI platform to perform model inference or service execution within the defined workflow.

20 Claims, 11 Drawing Sheets

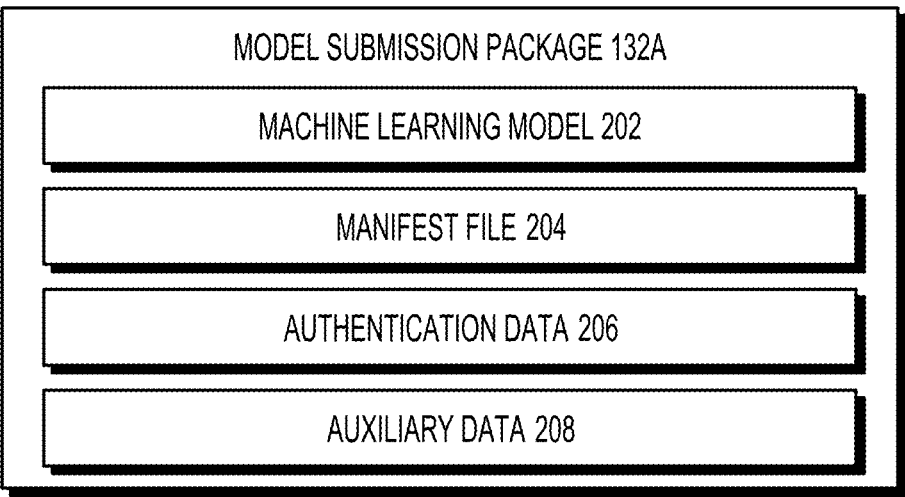
MODEL SUBMISSION PACKAGE 132A
MACHINE LEARNING MODEL 202
MANIFEST FILE 204
AUTHENTICATION DATA 206
AUXILIARY DATA 208
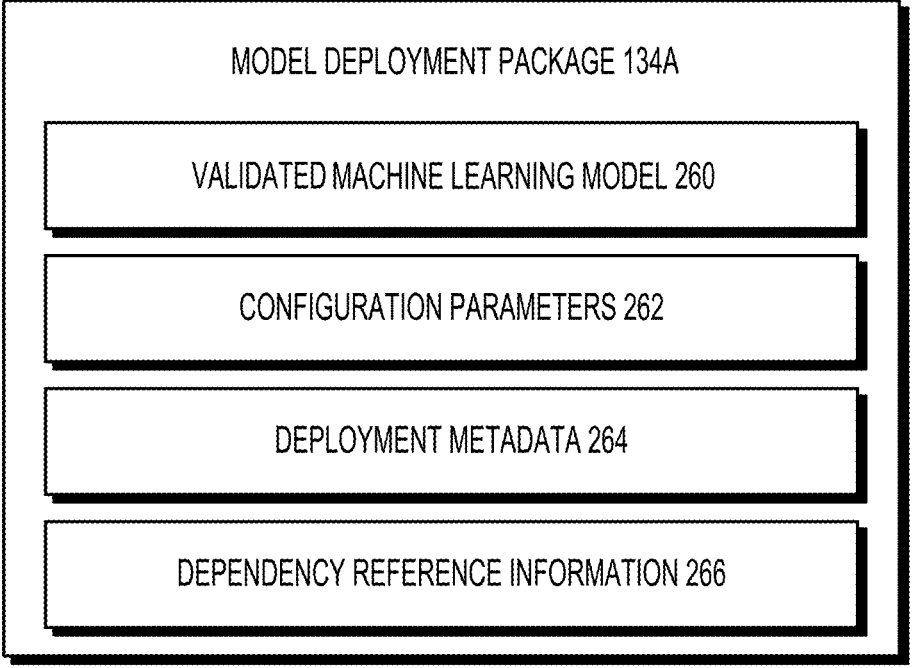
MODEL DEPLOYMENT PACKAGE 134A
VALIDATED MACHINE LEARNING MODEL 260
CONFIGURATION PARAMETERS 262
DEPLOYMENT METADATA 264
DEPENDENCY REFERENCE INFORMATION 266
*FIG. 2B*

184

180

AGENT DESIGNER INTERFACE 310

MODEL TOOLS 320

DEPLOYED MODELS 322

PREDEFINED MODELS 324

FLOW CONTROL 330

EXTERNAL TOOLS 332

DATA SOURCES 334

UTILITY BLOCKS 336

GRAPHICAL WORKFLOW CANVAS 312

INPUT TRIGGER 340

AGENT OBJECT (DEPLOYED) 342

VALIDATION AGENT OBJECT 344

AGENT OBJECT (PREDEFINED) 346

WORKFLOW OUTPUT 348

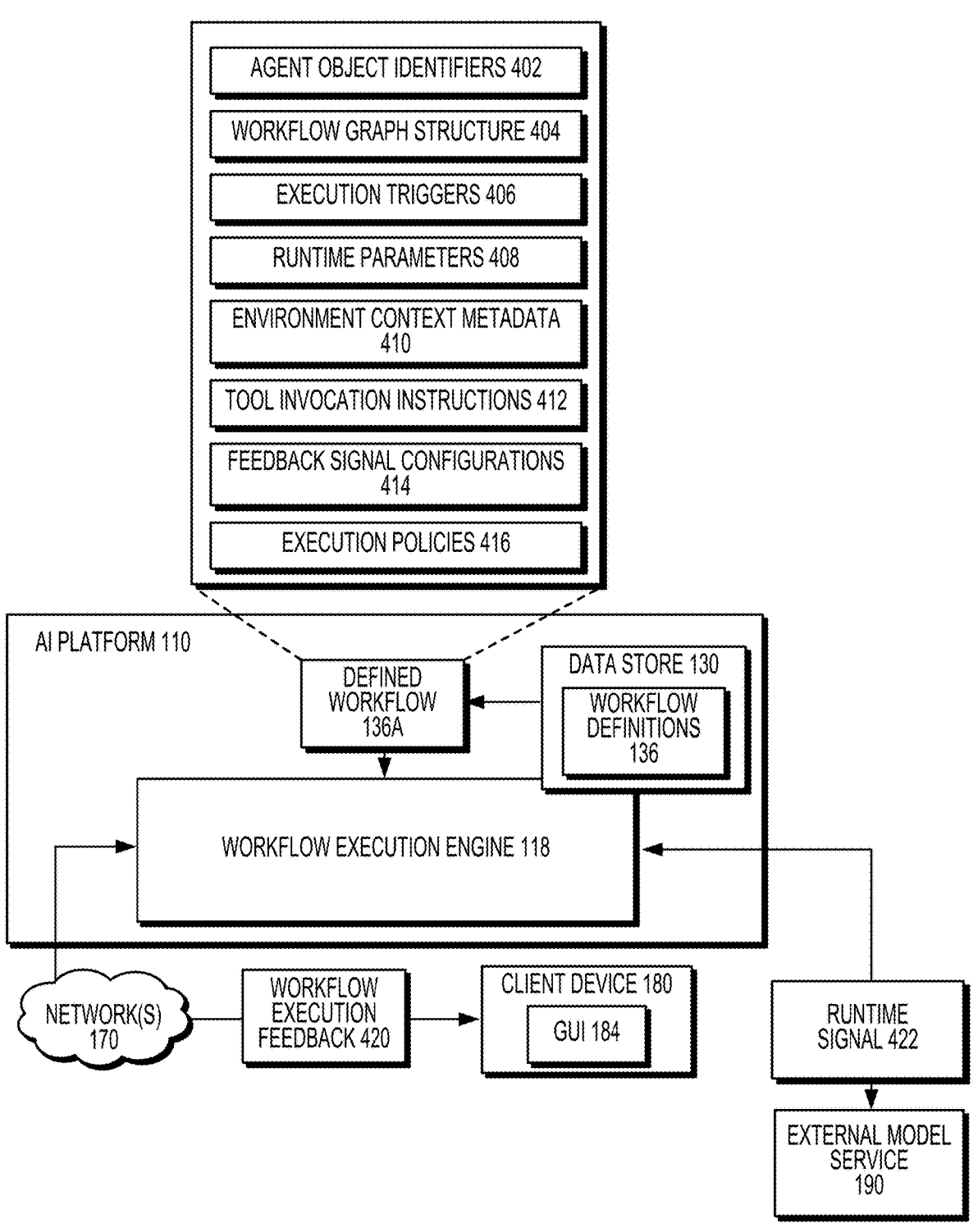

AGENT OBJECT IDENTIFIERS 402

WORKFLOW GRAPH STRUCTURE 404

EXECUTION TRIGGERS 406

RUNTIME PARAMETERS 408

ENVIRONMENT CONTEXT METADATA 410

TOOL INVOCATION INSTRUCTIONS 412

FEEDBACK SIGNAL CONFIGURATIONS 414

EXECUTION POLICIES 416

AI PLATFORM 110

DEFINED WORKFLOW 136A

DATA STORE 130

WORKFLOW DEFINITIONS 136

WORKFLOW EXECUTION ENGINE 118

NETWORK(S) 170

WORKFLOW EXECUTION FEEDBACK 420

CLIENT DEVICE 180

GUI 184

RUNTIME SIGNAL 422

EXTERNAL MODEL SERVICE 190

PROCESS MODEL SUBMISSION PACKAGE
502
(SEE ALSO FIG. 6)

PROVISION AND DEPLOY MODEL IN COMPUTE ENVIRONMENT
504
(SEE ALSO FIG. 7)

REGISTER MODEL ENDPOINT AS AGENT OBJECT AND RENDER ON CANVAS
506
(SEE ALSO FIG. 8)

EXECUTE WORKFLOW INCLUDING AGENT OBJECTS AND RETURN RESULTS
508
(SEE ALSO FIG. 9)

600

RECEIVE MODEL SUBMISSION PACKAGE

602

VALIDATE MANIFEST FILE AND APPLY POLICY CONSTRAINTS

604

EXTRACT CONFIGURATION PARAMETERS

606

GENERATE DEPLOYMENT METADATA

608

ASSEMBLE MODEL DEPLOYMENT PACKAGE

610

800

REGISTER MODEL ENDPOINT WITH AGENT DESIGNER
802

ASSIGN AGENT IDENTIFIER AND REGISTER IN REGISTRY
804

INSTANTIATE AND RENDER AGENT OBJECT ON CANVAS
806

900

RECEIVE DEFINED WORKFLOW
902

PARSE WORKFLOW STRUCTURE AND IDENTIFY AGENT OBJECTS
904

INTERPRET AGENT GRAPH AND AGENT OBJECT ROLES
906

RETRIEVE RUNTIME PARAMETERS AND CONTEXTUAL INPUT
908

INVOKE DEPLOYED MODEL BY MODEL ENDPOINT
910

INVOKE ADDITIONAL AGENT OBJECTS OR SERVICES
912

GENERATE RUNTIME SIGNAL FROM WORKFLOW EXECUTION
914

TRANSMIT RUNTIME SIGNAL TO CLIENT SYSTEM
916

INTEGRATION AND DEPLOYMENT OF TRADITIONAL MACHINE LEARNING MODELS FOR ARTIFICIAL INTELLIGENCE AGENTS

BACKGROUND

The adoption of machine learning (ML) and artificial intelligence (AI) technologies across industries has introduced new use cases and demands on the infrastructure used to manage, deploy, and integrate intelligent models within enterprise workflows. As organizations expand the scope of automated decision-making and predictive systems, the organizations are increasingly confronted with the challenges of onboarding new models, provisioning suitable runtime environments, and managing secure, scalable inference execution.

Conventional AI systems often involve fragmented tools and ad hoc deployment scripts that are not well-suited for managing complex or evolving enterprise use cases. These traditional approaches may require manual validation, rigid infrastructure configurations, and siloed integration processes, which can lead to inconsistent operations, delayed development cycles, and difficulty maintaining compliance with internal and external governance requirements.

A common limitation in many existing platforms is the lack of a uniform abstraction layer for callable model artifacts, tools, and external services. Without a standardized model for invocation and composition, developers must accommodate incompatible interfaces and integration protocols, increasing complexity and reducing system extensibility. In such environments, it becomes difficult to treat AI models and services as modular building blocks that can be reused across workflows.

In addition, workflow definition is frequently handled through imperative coding or limited graphical tools that do not support complex compositions, conditional logic, or user-defined execution behaviors. This limits collaboration between technical and non-technical stakeholders and reduces the transparency of how AI-enabled decisions are made. Runtime behavior, such as signal-based invocation, tool integration, and post-execution feedback, are also typically handled through isolated services or custom components. The ability to monitor, trace, and adapt workflows can be constrained in production environments due to such isolated services and custom components.

SUMMARY

The integration and deployment of machine learning (ML) models in configurable workflows is described. An example computer-implemented method for deploying a machine learning model within an artificial intelligence (AI) platform can include receiving a model submission package from a client device. The model submission package can include an ML model for deployment, a manifest file specifying configuration parameters for the ML model, and other supporting data and data structures. The method also includes extracting the configuration parameters from the manifest file, where the configuration parameters include memory allocation parameters, compute class parameters, and one or more environment variables associated with the ML model. The method can also include validating the manifest file for compliance with one or more policy constraints associated with deployment governance in some cases.

In some examples, the method also includes provisioning a compute environment within the AI platform based at least in part on the configuration parameters. Provisioning can include selecting a dynamic compute resource based at least in part on the memory allocation and the compute class and initializing the compute environment with the environment variables. The method can also include deploying the machine learning model to the compute environment and exposing the machine learning model as a callable endpoint within the AI platform.

In some examples, the method can also include registering the callable endpoint with an agent designer interface of the AI platform. The method can also include representing, by the agent designer interface, the callable endpoint as an agent object, and instantiating and rendering the agent object within a graphical workflow canvas of the agent designer interface. The method can also include enabling, by the graphical workflow canvas, a user to define an executable workflow.

The method can also include receiving a defined workflow. The computer-implemented method can include executing the defined workflow using a workflow engine configured to invoke a callable endpoint based at least in part on workflow logic in the defined workflow. The method can also include generating a runtime signal and a prediction result. The computer-implemented method can include transmitting the runtime signal to the client device for rendering on a user interface of the AI platform.

An example system for deploying an ML model within an AI platform includes one or more processors and a memory storing instructions that, when executed by the one or more processors, cause the one or more processors to receive a model submission package from a client device, extract configuration parameters from a manifest file in the model submission package, provision a compute environment within the AI platform based at least in part on the configuration parameters, expose the ML model as a callable endpoint within the AI platform, register the callable endpoint with an agent designer interface of the AI platform, represent, by the agent designer interface, the callable endpoint as an agent object, instantiate and render, by the agent designer interface, the agent object within a graphical workflow canvas of the agent designer interface, and enable, by the graphical workflow canvas, a user to define an executable workflow comprising the agent object such that the executable workflow is invoked by the AI platform.

An example non-transitory computer-readable medium stores instructions that, when executed by one or more processors of an artificial intelligence (AI) platform, cause the one or more processors to receive a model submission package from a client device, extract configuration parameters from a manifest file in the model submission package, provision a compute environment within the AI platform based at least in part on the configuration parameters, expose the ML model as a callable endpoint within the AI platform, register the callable endpoint with an agent designer interface of the AI platform, represent, by the agent designer interface, the callable endpoint as an agent object, instantiate and render, by the agent designer interface, the agent object within a graphical workflow canvas of the agent designer interface, and enable, by the graphical workflow canvas, a user to define an executable workflow comprising the agent object such that the executable workflow is invoked by the AI platform.

This summary is provided to introduce selected concepts that are further described in the detailed description. It is not intended to identify key or essential features of the claimed subject matter, nor to limit the scope of the claims.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2B depicts example model submission, deployment, and related data packages used by the AI platform in the environment shown in FIG. 1 according to an example implementation.

FIG. 4 depicts an example execution of a defined workflow by a workflow execution engine of the AI platform shown in FIG. 1 according to an example implementation.

DETAILED DESCRIPTION

Examples of the integration and deployment of new machine learning (ML), artificial intelligence (AI), and related models into AI platforms are described. The AI platforms described herein offer structured frameworks for integrating, deploying, exposing, and executing machine learning models, such as foundation models, fine-tuned task-specific models, and conventional classifiers, across cloud-based or hybrid compute environments. The platforms allow users to register callable endpoints for the models. The callable endpoints can be associated with agent objects, which are representative of deployed ML models. The platform also allows users to construct executable workflows including the agent objects using a graphical designer interface.

An agent object for an ML model can be registered with an AI platform based on a submission package for the ML model. The submission package can be validated for policy compliance, provisioned by a compute provisioner, and exposed as a callable endpoint. The callable endpoint can be added to and referenced in defined, executable workflows, which can be authored by an end user using a graphical workflow canvas. The defined workflows can be executed by a centralized execution engine of the AI platform. Execution is driven by input triggers and results in runtime invocation of both internal and external services. Feedback is captured and returned to the originating client device.

The integration and deployment of ML models, AI models, and related models according to the concepts described herein offers a number of advantages, such as modular agent objects that encapsulate models and tools into callable services, the reuse and abstraction of AI capabilities, graphical workflow interfaces that allow non-technical users to visually construct, test, and deploy multi-agent workflows with minimal coding, automatic validation and provisioning of model deployments based on policy constraints and extracted metadata, reducing infrastructure configuration errors, dynamic runtime invocation and signal-based control, enabling integration with third-party APIs, monitoring systems, and event-driven architectures, feedback loops that connect the execution outcomes back to workflow authors and system monitors by structured feedback channels, declarative execution policies and contextual metadata, allowing workflows to adapt based on environmental conditions or operational context, enterprise readiness through support for authentication, dependency resolution, and model governance workflows integrated with existing information technology (IT) systems, and other benefits.

Figure 1:
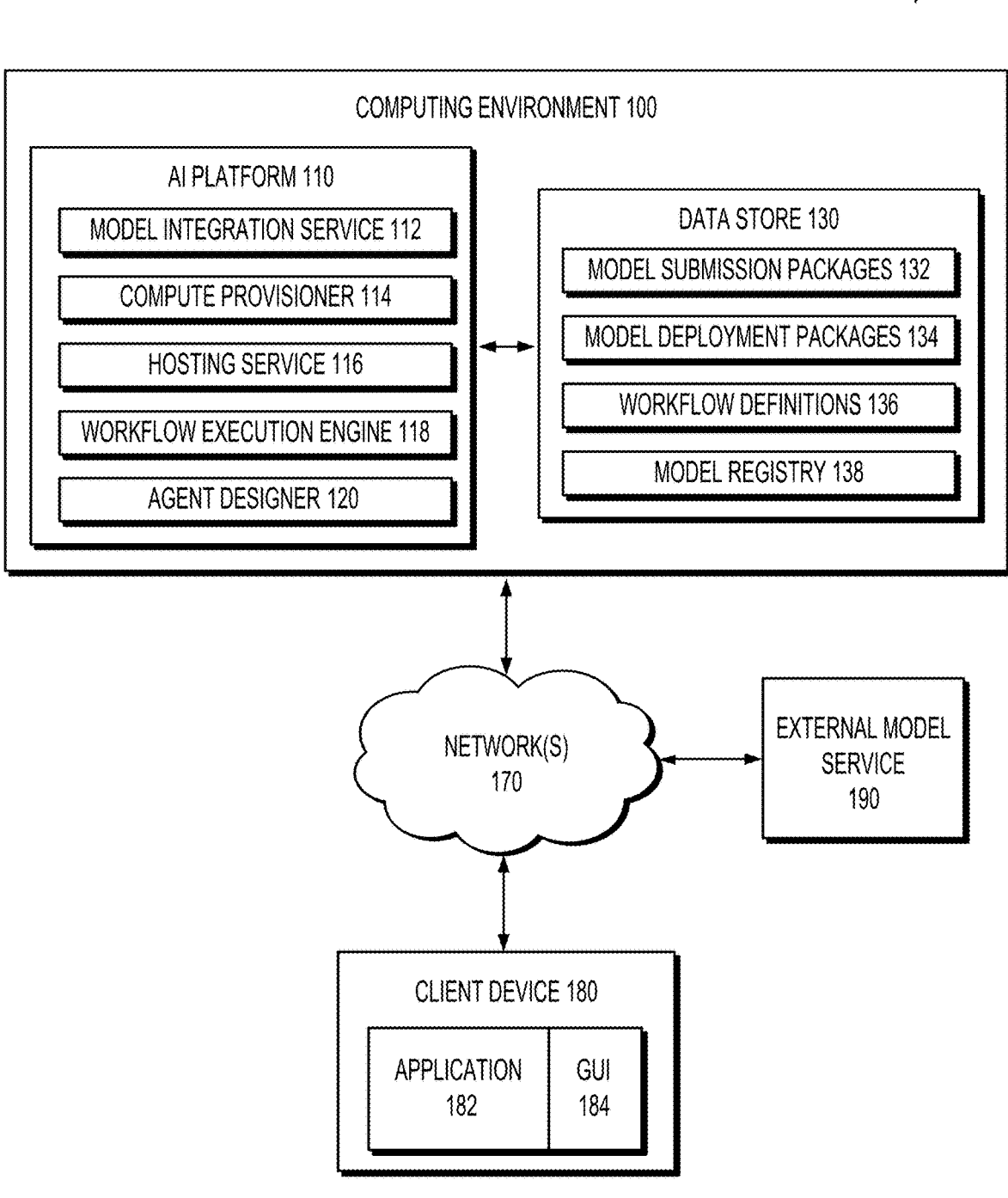
FIG. 1 depicts an example networked operating environment configured for the deployment and execution of machine learning models within an artificial intelligence (AI) platform according to an example implementation.

FIG. 1 depicts an example networked operating environment 10 (also "environment 10") for the deployment and execution of ML models within an AI platform according to an example implementation. The environment 10 includes a computing environment 100, a network 170, a client device 180, and an external model service 190 in the example depicted. These and other components of the environment 10 are described in additional detail below. The environment 10 is illustrated as a representative example of a networked environment of computing systems and devices capable of the configurable integration and deployment of models, such as ML, AI, and related models, into processing stacks and related workflows. The devices in the environment 10 can be deployed logically and physically in a variety of ways, as described below. The environment 10 is not exhaustively illustrated, and the environment 10 can include additional computing systems and components that are not expressly shown. Thus, although not shown in FIG. 1, the environment 10 can also include other servers, end-user client devices, data storage systems, peripherals, internet-of-things (IoT) devices, and other network host computing systems and devices. The environment 10 can also omit one or more of the devices shown in other cases.

Among other components, the computing environment 100 includes a data store 130 and an AI platform 110. The types of data stored in the data store 130 and the operational components of the AI platform 110 are described in further detail below. At the physical hardware layer, the computing environment 100 can be embodied as one or more computing devices, such as rack servers in one example, including processing circuitry and memory. The computing environment 100 can be hosted or deployed in a number of different ways. As examples, the computing environment 100 can be hosted as a multi-tenant public cloud environment, hosted as an off-premises private or dedicated cloud environment, hosted as an on-premises private cloud environment, or some hybrid combination thereof. Those and other deployment options are described below.

The computing environment 100 can be embodied as physical servers communicatively coupled together by a computer network, including the network 170. The servers or other computing devices of the computing environment 100 can be hosted at one or more geographic locations, including on- and off-premises locations and combinations thereof. The computing environment 100 can be embodied as an elastic or scalable computing environment in some cases. The servers of the computing environment 100 can execute a hypervisor layer, an orchestration layer, and other executable layers for logically organizing the underlying hardware of the servers into virtual instances. The partitions of the hardware can be organized into any number of private partitions (e.g., private cloud partitions), public partitions (e.g., public cloud partitions), and hybrid public/private partitions to support the services provided by the AI platform 110 for different users, parties, or organizations. The computing environment 100 can also be embodied, at least in part, as functional or logical modules implemented through the execution of computer-readable instructions, which can be stored on the computing environment 100 and other locations in the environment 10. Examples of functional or logical modules are described below, and additional aspects of the hardware and software layers of the computing environment 100 are also described below.

The network 170 can include the Internet, intranets, extranets, wide area networks (WANs), local area networks (LANs), wired networks (e.g., copper, fiber-optic, etc.), wireless (e.g., radio frequency (RF)) networks, and related computer networks, and combinations thereof. The network 170 can include a combination of network interface adapters, switches, routers, access points, and other network-related hardware devices with processing circuitry and memory. The network 170 can include a combination of public networks, private networks, virtual public networks, virtual private networks, and other types of networks. The computing environment 100, the client device 180, the external model service 190, and other network host computing systems and devices in the environment 10 can communicate data among each other over the network 170. Data can be communicated over the network 170 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and other protocols and interconnect frameworks without limitation.

The client device 180 is representative of one or more end-user client devices. The client device 180 can be embodied as a range of different computing devices, such as a desktop computer (e.g., Windows®, macOS®, Linux® workstations), a laptop computer, a notebook or tablet computer (e.g., iPad® or Android® tablet), a dedicated terminal or thin client, an IoT device, a personal digital assistant, a smart phone (e.g., iOS®, Android®, related mobile device), a wearable computing device (e.g., smartwatch, augmented reality headset, virtual reality headset, etc.), a consumer electronic device (e.g., smart television, game console, streaming device), an embedded control system, a command-line interface device, a terminal-based system, a virtual desktop infrastructure (VDI), an edge computing node, or related computing devices or combinations thereof. The client device 180 can include peripheral devices or components, such as display interfaces and input/output devices. The client device 180 can be relied upon to interface with the computing environment 100 for the deployment of ML models according to the embodiments.

The client device 180 can execute an application 182, which is representative of one or more applications, application extensions, or other application-related components that can be executed on the client device 180. The application 182 can include hypertext-based network browsers, such as the Internet Explorer®, Firefox®, Chrome®, Safari®, or Silk® browsers, among other types of browsers. Alternatively, the application 182 can be embodied as other types of applications, such as an e-mail clients, messaging clients, document editors or viewers, file browsers, or other applications or application extensions for other purposes. As described below, the application 182 can be embodied as a hypertext-based network browser in at least one example, and the application 182 can generate a graphical user interface (GUI) 184 in connection with AI platform 110. A user of the client device 180 can design executable workflows of ML models using the GUI 184, as described below.

According to aspects of the embodiments, the AI platform 110 of the computing environment 100 enables the intake, integration, deployment, provisioning, runtime exposure, and workflow-based invocation of ML models using a graphical user interface accessible on the client device 180. The AI platform 110 facilitates the registration agent objects as callable models and their use in executable workflows instantiated within a low-code/no-code environment. The AI platform 110 also enables the configuration, deployment, and execution of such agent-based applications. The AI platform 110 includes core platform services and execution layers that abstract infrastructure details and expose declarative interfaces to non-specialist users. The AI platform 110 provides secure application programming interface (API) access, resource provisioning, model runtime exposure, agent orchestration, and runtime signal feedback routing, among other operational functions.

The AI platform 110 is capable of the intake, integration, deployment, provisioning, runtime exposure, and workflow-based invocation many different types of ML and AI models. Examples of the ML and AI models include text generation models (e.g., large-language models (LLMs)), image generation models, video generation models, music generation models, three-dimensional (e.g., point cloud) generation models, biology and science (e.g., protein, ligand, etc.) generation models, and other models. The ML and AI models described herein are not limited to such models, however, and the AI platform 110 can operate with a range of different types of ML and AI models.

The components of the AI platform 110 include a model integration service 112, a compute provisioner 114, a hosting service 116, a workflow execution engine 118, an agent designer 120, and possibly other components. The components of the AI platform 110 can be implemented in containers and orchestrated by a container orchestration framework (e.g., Kubernetes, Docker, etc.) in at least one example. The data store 130 includes memory areas for storage of model submission packages 132, model deployment packages 134, workflow definitions 136, a model registry 138, and other types of data.

As noted above, the AI platform 110 enables the intake, integration, deployment, provisioning, runtime exposure, and workflow-based invocation of new ML models using the GUI 184 accessible on the client device 180. For example, a user of the client device 180 can provide one or more ML models from the client device 180, or from another host location within the environment 10, to the computing environment 100 and the AI platform 110. In turn, the AI platform 110 can intake and deploy the ML models received from the client device 180. The ML models from the client device 180 can be deployed by the AI platform 110 and be made accessible for use alongside other, predefined (or preexisting) ML models. A full registry of the models available to the AI platform 110, including deployed ML models, predefined ML models, AI models, generative AI models, and other models can be stored in the model registry 138.

The model integration service 112 of the AI platform 110 can perform operations for the intake of new ML models based on model submission packages 132 received from the client device 180. The model integration service 112 can also generate model deployment packages 134 based on the model submission packages 132.

The compute provisioner 114 can evaluate configuration parameters of and determine the appropriate compute resources needed for deployment of the ML models, with reference to the model deployment packages 134 generated by the model integration service 112. The compute provisioner 114 can also generate provisioning directives for hosting the ML models.

The hosting service 116 can host runtime environments for execution of the ML models based on the provisioning directives from the compute provisioner 114. The hosting service 116 can also instantiate ML models for execution in the runtime environments and generate and expose callable endpoints to the ML models. The callable endpoints can be registered in the model registry 138 of the data store 130, for reference by the workflow execution engine 118 and the agent designer 120.

A user of the client device 180 can also design executable workflows including combinations of the ML models listed in the model registry 138 of the AI platform 110 in a low-code/no-code graphical workflow canvas environment. For example, the agent designer 120 can operate with the application 182 on the client device 180 to generate the GUI 184, and the GUI 184 can provide a graphical workflow canvas for designing executable workflows. Through the GUI 184, a user of the client device 180 can view and position agent objects in the graphical workflow canvas. The agent objects are associated with the ML, AI, generative AI, and related models that are registered in the model registry 138 and accessible for execution. The executable workflows can be developed, refined, and tested by a user of the client device 180 using the AI platform 110. The executable workflows can also be developed by a user of the client device 180 over time and saved under the workflow definitions 136 in the data store 130.

In addition to the agent objects, a user of the client device 180 can also view and position other data inputs, data outputs, data sources, flow control tools, external tools, utilities, and other data objects in the graphical workflow canvas using the GUI 184. Even large and relatively complicated workflows can be easily defined within a low-code/no-code environment in the GUI 184 generated by the agent designer 120 of the AI platform 110. Once developed, the workflows can be stored as the workflow definitions 136 in the data store 130. Thus, the workflow definitions 136 provides a type of workflow repository and can store the defined workflows described herein. A user of the client device 180 can also direct the workflow execution engine 118 to process or execute the workflows generated by the agent designer 120. These and other aspects of the embodiments are described below.

Figure 2A:
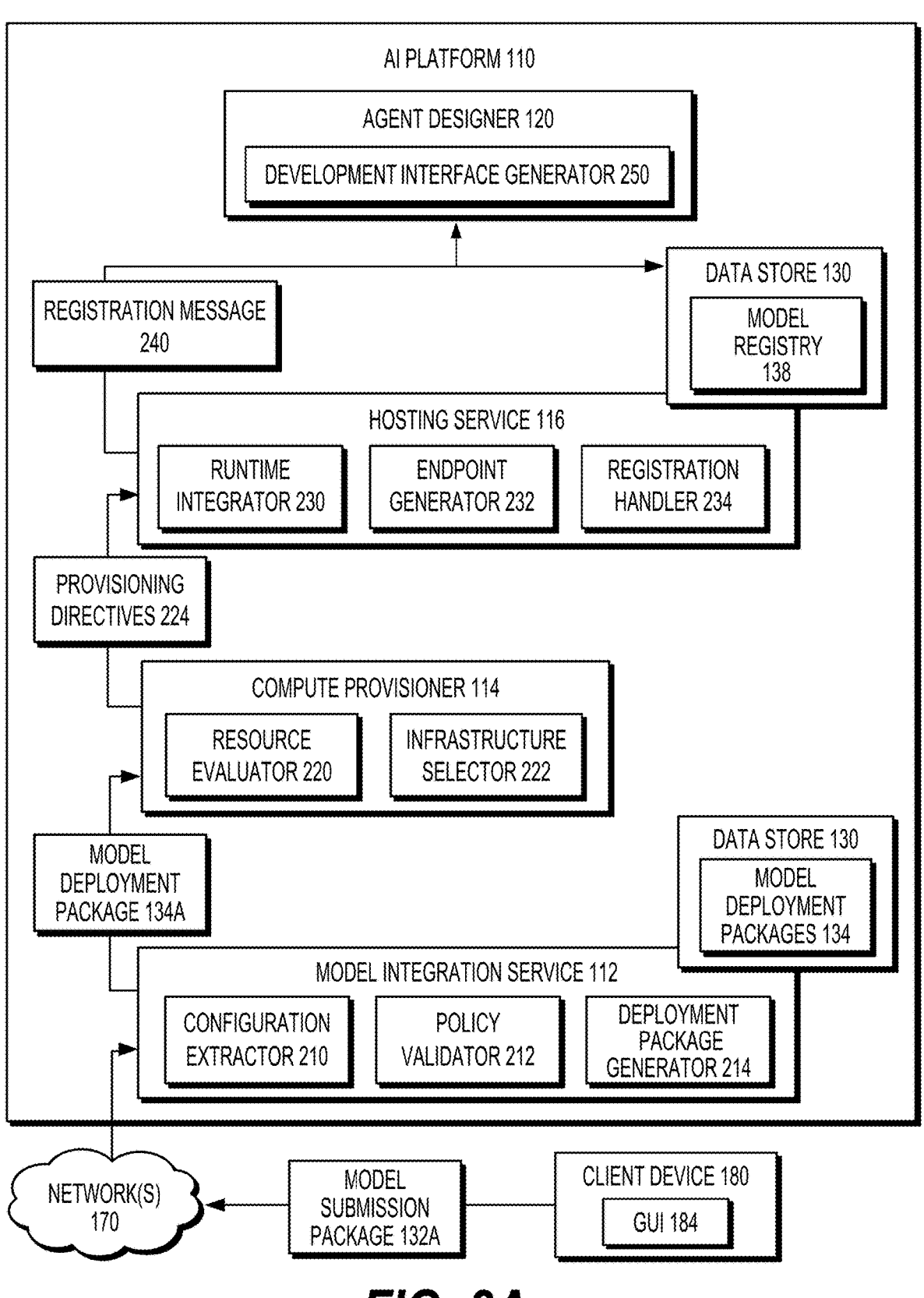
FIG. 2A depicts example components of the AI platform in the environment shown in FIG. 1 according to an example implementation.

FIG. 2A depicts components of the AI platform 110 in the environment 10 shown in FIG. 1. An example description of the intake, integration, deployment, provisioning, and runtime exposure of ML models by the AI platform 110 is described with reference to FIG. 2A. A user of the client device 180 can separately develop a new ML model and wish to add or embed the new ML model into an executable workflow as a new agent object. Thus, as shown at the bottom of FIG. 2A, the client device 180 can send a model submission package 132A to the AI platform 110 over the network 170. The model submission package 132A can be related to the new ML model for deployment by the AI platform 110. The model submission package 132A can be uploaded to the AI platform 110 using the GUI 184, for example, as also described below. The AI platform 110 can store the model submission package 132A received from the client device 180 in the data store 130 as one of the model submission packages 132. The model submission package 132A can include an ML model along with a package of other supporting data.

FIG. 2B depicts example parts of the model submission package 132A. As shown in FIG. 2B, the model submission package 132A includes an ML model 202, a manifest file 204, authentication data 206, and auxiliary data 208, although the model submission package 132A is not limited to the types of data shown in FIG. 2B and described herein. The model submission package 132A can be structured, at least in part, using JavaScript Object Notation (JSON), extensible markup language (XML), XML schema definition, yet another markup language (YAML), and other markup formats and combinations thereof. The model submission package 132A can also be encrypted in some cases, while being transmitted between the client device 180 and the AI platform 110.

The ML model 202 in the model submission package 132A includes a structured, normalized representation of an ML model and its operational context to be deployed in the AI platform 110. The ML model 202 represents a type of deployable ML computational artifact, which can be embodied in various formats, such as serialized weights of a network, the structure of a learning network, model checkpoints, and related data and data structures. The ML model 202 can be derived from traditional machine learning frameworks, transformer-based LLMs, or other model classes supported by the AI platform 110. In some cases, the ML model 202 can be embodied as one or more predefined model classes, such as language models, vision models, structured data models, time series models, recommendation models, tabular models, rule-based models, graph-based models, audio processing models, multimodal models, embedded hardware models, or other models. The ML model 202 can also include a validated container image, environment variable mappings, runtime class identifiers (e.g., memory tier, GPU/CPU flag), access control scopes, and related data in some cases.

The manifest file 204 in the model submission package 132A defines a set of configuration parameters associated with the ML model 202. The configuration parameters can specify the computational resources needed for processing the ML model 202, such as memory allocations, compute class constraints, environment variables to be set at runtime, execution triggers, and metadata describing the purpose and/or expected behavior of the ML model 202. Thus, the manifest file 204 serves as a structured, machine-readable declaration that governs how the ML model 202 is to be provisioned, exposed, and regulated within the AI platform 110.

The authentication data 206 in the model submission package 132A includes platform-specific credentials that permit access control validation and policy enforcement for the ML model 202. The authentication data 206 can include security tokens, permission scopes, API keys, signed identity assertions, and other data used to confirm the authority of the client device 108 to register and execute the ML model 202 within the AI platform 110.

The auxiliary data 208 in the model submission package 132A includes optional metadata associated with the ML model 202. The auxiliary data 208 can include versioning annotations, classification tags, dependency references, descriptive summaries, and other model-related contextual information. The auxiliary data 208, although not required for execution, can be used by downstream services for lifecycle tracking and management of the ML model 202.

Returning to FIG. 2A, the model integration service 112 of the AI platform 110 is configured to unpackage and process the model submission package 132A. The model integration service 112 can orchestrate a series of data validation and transformation procedures to normalize the model submission package 132A into a format suitable for infrastructure deployment by the AI platform 110. To that end, the model integration service 112 includes a configuration extractor 210, a policy validator 212, and a deployment package generator 214.

The configuration extractor 210 can extract the ML model 202 from the model submission package 132A. The configuration extractor 210 can also extract the configuration metadata, configuration parameters, and other data for the ML model 202 from the manifest file 204, extract the authentication data 206, and extract the auxiliary data 208. The configuration extractor 210 can save any and all extracted data and data structures from the model submission package 132A to the data store 130, for further processing, as needed. The configuration extractor 210 can also analyze the manifest file 204 to isolate individual configuration parameters required for deployment of the ML model 202. This operation ensures that each configuration parameter for the ML model 202 is validated and converted into a standard internal representation for processing by the AI platform 110. Examples of such configuration parameters include environment variable declarations, target compute class identifiers, memory allocation specifications, and other parameters needed for the operation and execution of the ML model 202.

Once extracted, the policy validator 212 is configured to compare the configuration metadata, configuration parameters, and other supporting data for the ML model 202 against policy constraints of the AI platform 110. The policy validator 212 can perform a compliance check by evaluating the metadata, parameters, and other supporting data for the ML model 202 against a set of deployment governance rules. The deployment governance rules, which can be stored in the data store 130, can define the types of ML, AI, and other models which can be submitted by a user of the client device 180, deployed by the AI platform 110, and are within the range of permissible resource usage conditions. The deployment governance rules can also identify any forbidden dependencies in the ML model 202, evaluate any access or deployment constraints tied to the client device 180, evaluate any constraints on the user of the client device 180, and evaluate other governance rules. Thus, the policy validator 212 can be configured to apply a deployment policy prior to the compute provisioner 114 provisioning any compute environment for the ML model 202.

Once extracted, validated, and normalized, the deployment package generator 214 can generate a model deployment package 134A as shown in FIG. 2A. The model deployment package 134A can be generated by the deployment package generator 214 based on the configuration metadata, configuration parameters, and other data extracted from the model submission package 132A. The deployment package generator 214 is configured to compile the validated and normalized configuration components into the model deployment package 134A.

As shown in FIG. 2B, an example of the model deployment package 134A includes a validated ML model 260 (also "ML model 260"), which has passed all policy and structural validations. The model deployment package 134A also includes configuration parameters 262, which include the configuration metadata and parameters from the manifest file 204, after being validated and reformatted. The model deployment package 134A also includes deployment metadata 264. The deployment metadata 264 can include any identifiers and annotations generated by the model integration service 112. The model deployment package 134A also includes dependency reference information 266, which details or enumerates any external artifacts, runtime services, or other dependencies required to execute the validated ML model 260. The deployment package generator 214 can generate the model deployment package 134A, for example, and store the model deployment package 134A as one of the model deployment packages 134 in the data store 130.

Referring again to FIG. 2A, the compute provisioner 114 is part of a runtime provisioning pipeline for the secure, compliant deployment of ML models within the compute runtime of the AI platform 110. In that context, the compute provisioner 114 orchestrates a provisioning process based on the model deployment package 134A generated by the model integration service 112. The compute provisioner 114 can retrieve the model deployment package 134A, among other model deployment packages, from the model integration service 112 or the data store 130. The compute provisioner 114 includes specialized modules configured to interpret the deployment requirements outlined in the model deployment package 134A and translate the requirements into provisioning directives 224 for the hosting service 116. The compute provisioner 114 can select dynamic compute resources from a container orchestration cluster managed by the AI platform 110, for example, based on the deployment requirements. These and other operational aspects of the compute provisioner 114 are described below. The compute provisioner 114 includes a resource evaluator 220 and an infrastructure selector 222.

The resource evaluator 220 can analyze the configuration parameters 262 and the deployment metadata 264 in the model deployment package 134A to assess the compute, memory, network, and security specifications needed by the validated ML model 260. For example, if the configuration parameters 262 specify a GPU-enabled runtime with sandbox isolation, the resource evaluator 220 can identify compatible hardware node pools and applicable isolation layers suitable for such demands. Similar evaluations and identifications can be performed to find the compatible hardware node pools with sufficient memory, network, and security specifications.

The infrastructure selector 222 can use the assessment provided by the resource evaluator 220 to select one or more compute environments available to the AI platform 110. The infrastructure selector 222 can determine infrastructure resources to be instantiated in some cases, such as containerized workloads, virtual machines, or serverless runtimes based on platform-wide resource availability, client policy scopes, performance guarantees, and related criteria. The infrastructure selector 222 can also convert the platform-level provisioning logic of the AI platform 110 into standardized deployment instructions for the host service 116. The infrastructure selector 222 can generate the provisioning directives 224 as the standardized deployment instructions for the host service 116 and store the provisioning directives 224 in the data store 130. The provisioning directives 224 can define a range of requirements for the validated ML model 260, such as the specification of an initialization order, container configuration, environment variables, network policies, integration rules, and/or other parameters for the deployment environment of the validated ML model 260.

The hosting service 116 is configured to instantiate a runtime compute environment for the validated ML model 260 based on the provisioning directives 224. The hosting service 116 is also configured to prepare the runtime compute environment for model deployment, deploy the validated ML model 260 to the runtime compute environment, and prepare the validated ML model 260 for exposure as a callable service. The host service 116 can implement the provisioning directives 224 by instantiating the runtime compute environment according to the specifications defined in the provisioning directives 224. Instantiating the runtime compute environment can include creating isolated runtime containers, injecting environment variables, mounting file systems, preloading any necessary dependencies referenced in the model deployment package 134A, and/or other preparations.

As shown in FIG. 2A, the hosting service 116 also includes a runtime integrator 230, and endpoint generator 232, and a registration handler 234. The runtime integrator 230 is configured to bind the validated ML model 260 to the instantiated runtime compute environment, load all necessary dependencies, ensure compliance with runtime constraints (e.g., model timeout settings or memory limits), and take any other actions that may be needed for the operation of the validated ML model 260.

The endpoint generator 232 is configured to generate a callable endpoint for the validated ML model 260 and assign the callable endpoint to a platform-unique URI, address, or callable handle within the service mesh or API gateway of the AI platform 110. The callable endpoint can include a unique network or runtime address for calling the ML model 260, a defined contract for calling the ML model 260 (e.g., the expected inputs, such as query parameters, JSON body, headers, etc. and the expected outputs, such as HTTP status codes, response body, emitted events, etc.), and other details. The callable endpoint can be implemented as a type of internal API exposed within a service mesh of the AI platform 110, behind a private ingress controller. The endpoint generator 232 can also ensure that the callable endpoint is secured, auditable, and consistent with routing policies of the AI platform 110.

The registration handler 234 is configured to ensure that the callable endpoint is properly recorded in the model registry 138 of the data store 130 and made discoverable to downstream workflow services within the AI platform 110, such as the agent designer 120. To that end, the registration handler 234 can generate a registration message 240, which can be recorded in the model registry 138 and sent to the agent designer 120. The registration message 240 includes metadata describing the callable endpoint for the ML model 260, such as the platform-unique URI, address, or callable handle for the ML model 260, along with permission scopes and usage contracts. In some cases, the registration message 240, or some notification thereof, can also be communicated from the AI platform 110 back to the client device 180.

Following successful deployment of the ML model 260 by the hosting service 116, the AI platform 110 can transition into a model runtime exposure phase. The callable endpoint for the ML model 260 can be active and capable of receiving runtime invocations during the runtime exposure phase, and the agent designer 120 can be updated to reflect the availability of the ML model 260 as an agent object. For example, the registration message 240, or review of the model registry 138, can prompt the agent designer 120 to instantiate (e.g., display) a new agent object representing the callable endpoint for the ML model 260 within an agent designer interface generated by the agent designer 120. In that way, the GUI 184 can be updated on the client device 180 to include a new agent object representing the callable endpoint for the ML model 260, as also described below with reference to FIG. 3.

As used herein, "agent objects" are modular components representing callable services that can be invoked within an executable workflow, and examples of agent objects are described below with reference to FIG. 3. The agent objects can be representative of ML models, AI models, data sources, integrators, tools, code blocks, and other components available in an agent designer interface. The callable endpoint for the ML model 260 becomes a selectable and linkable agent object node within the agent designer interface of the GUI 184 on the client device 180. The appearance of the agent object node within the GUI 184 enables the user of the client device 180 to visually link the validated ML model 260 into larger workflow compositions. The appearance of the agent object node within the GUI 184 also signifies the completion of the integration loop, starting from submission of the model submission package 132A and ending with the runtime deployment of the validated ML model 260 in the model deployment package134A by the AI platform 110.

Figure 3:
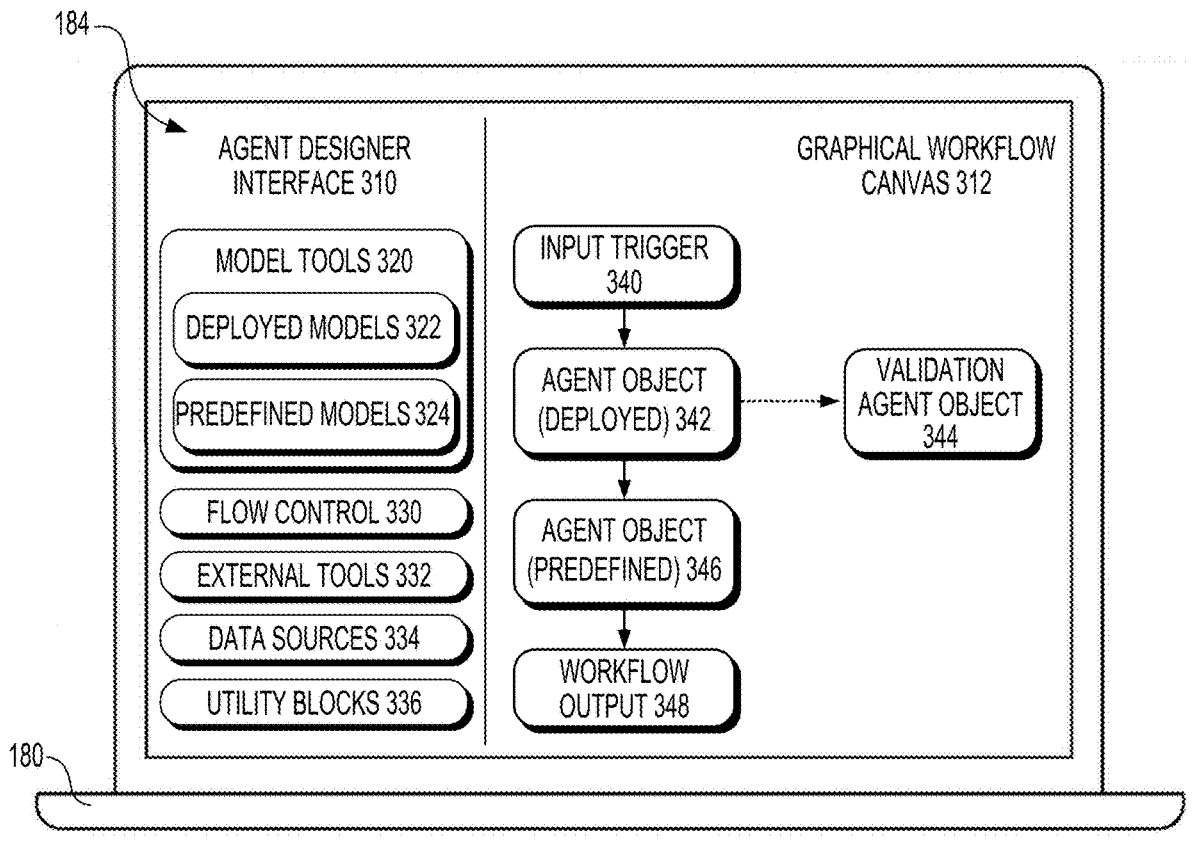
FIG. 3 depicts an example graphical user interface (GUI) provided by an agent designer of the AI platform shown in FIG. 1, displayed on a client device, according to an example implementation.

FIG. 3 depicts an example of a GUI 184 presented on a display of the client device 180. The GUI 184 can be generated in part by network pages served by a development interface generator 250 (see FIG. 2) of the agent designer 120 of the AI platform 110 to the application 182 executing on the client device 180, which can be a hypertext-based network browser or native application. The GUI 184 includes an agent designer interface 310 and a graphical workflow canvas 312, among other user interface elements or areas. The GUI 184 allows a user of the client device 180 to visually define, construct, edit, and manage executable workflows within the graphical workflow canvas 312 using agent objects that are available for selection within the agent designer interface 310. The agent objects can be dragged and dropped, for example, from the agent designer interface 310 to the graphical workflow canvas 312 and arranged together in a logical fashion. The GUI 184 is depicted as a representative example in FIG. 3 and can vary as compared to that shown.

The agent designer interface 310 includes a categorized tool panel that enables the user of the client device 180 to select a range of different agent objects. The tool panel includes a model tools section 320, which is divided into deployed models 322 and predefined models 324. The deployed models 322 can include agent objects for ML models that have been previously submitted, deployed, and exposed as callable endpoints on the AI platform 110. In other words, the deployed models 322 can include agent objects for the ML models that are registered in the model registry 138 of the data store 130, as described above with reference to FIG. 2. The agent objects of the deployed models 322 are thus associated with callable endpoints and can be added to executable workflows in the graphical workflow canvas 312.

The predefined models 324 can include one or more different types or classes of models that have been registered with the AI platform 110 for use in addition to executable workflows. Examples of the predefined models 324 include, but are not limited to, general-purpose transformer models, proprietary fine-tuned models, structured data models, vision models, rule-based models, audio or speech processing models, recommendation models, tabular models, time-series models, multimodal models, graph-based models, and embedded hardware models. The predefined models 324 can be third-party models available to, but not deployed by, users of the AI platform 110.

A flow control section 330 of the agent designer interface 310 includes agent objects that represent logical control structures. The logical control structures can include branching elements (e.g., if/then/else elements), parallel execution operators, loops, and other control constructs for orchestrating workflow logic.

An external tools section 332 of the agent designer interface 310 includes interface components that allow integration with external systems, services, or APIs. The interface components can include webhook connectors, REST/RPC invokers, prebuilt interfaces for third-party tools, such as customer relationship management (CRM) systems, messaging platforms, or analytics services, among other types of interface components.

A data sources section 334 of the agent designer interface 310 includes agent objects configured to retrieve or query structured and unstructured data, such as database connectors, file parsers, streaming data listeners, and other types of input sources. Objects in the data sources section 334 are designed to facilitate the availability of data in executable workflows. A utility blocks section 336 of the agent designer interface 310 includes operational modules that support workflow composition and logic. These can include transformers (e.g., JSON to CSV), formatters, data validators, enrichment modules, error handlers, logging agents, and similar tools. Other types of agents can also be presented for use in the agent designer interface 310.

The graphical workflow canvas 312 is a visual interface that allows a user of the client device 180 to construct executable workflows by dragging agent objects from the agent designer interface 310 to the graphical workflow canvas 312 and logically linking the agent objects together within the graphical workflow canvas 312. An example set of agent objects is shown on the graphical workflow canvas 312 in FIG. 3. The workflow begins with an input trigger 340, which can be configured to respond to external events or user inputs that activate workflow execution. The input trigger 340 is connected to an agent object 342, which is associated with an ML model that has been deployed and exposed as a callable endpoint of the AI platform 110, as described above.

The agent object 342 is linked to another agent object 346, which is associated with a predefined, third-party model of the AI platform 110. The agent object 346 can perform post-processing, analysis, or downstream transformations using the output of the agent object 342 in the example shown. The operations of the agent object 346 can include data filtering, result formatting, or secondary inference steps, as examples. A workflow output agent object 348 represents a terminal block in the execution graph in the graphical workflow canvas 312. The workflow output agent object 348 can be used to display output data, forward responses to external systems, trigger notifications, store inference results, or provide other types of outputs.

The agent object 342 is also associated with a validation agent object 344, depicted as a side-branch from the callable endpoint agent object 342 in FIG. 3. The validation agent object 344 can be configured to verify inputs, confirm outputs against constraints, ensure conformance to expected schemas, or perform other types of validations. The validation by the validation agent object 344 can be performed before, during, or after execution of the agent object 342, depending on the configuration of the workflow.

FIG. 3 illustrates only an example of an executable workflow that can be defined, constructed, edited, and saved using the agent designer 120 of the AI platform 110. A user of the client device 180 can define a variety of different executable workflows in the graphical workflow canvas 312 of the GUI 184 shown in FIG. 3. The executable workflows can be embodied as machine-readable specifications, including references to registered agent objects, a directed execution graph, configuration metadata, trigger conditions, routing logic, and other data. Executable workflows can be stored as the workflow definitions 136 in data store 130 of the AI platform 110, as the workflows are being developed. In some cases, the executable workflows can also be stored on the client device 180, if needed for backup or portability. The execution of the workflows developed using the agent designer 120 of the AI platform 110 can be orchestrated by the workflow execution engine 118, as described below with reference to FIG. 4.

FIG. 4 depicts an example execution of a defined workflow 136A by the workflow execution engine 118 of the AI platform 110 shown in FIG. 1. The defined workflow 136A can be an executable workflow defined by a user of the client device 180, for example, using the agent designer 120 of the AI platform 110, as described above with reference to FIG. 3. In the example shown, the defined workflow 136A is identified for execution by the client device 180. The execution of the defined workflow 136A can occur at any time, be scheduled by an execution scheduler, or occur according to other triggers or events. The defined workflow 136A can be accessed among those stored in the workflow definitions 136 by the workflow execution engine 118, after being identified by the client device 180. Alternatively, the defined workflow 136A can be provided directly from the client device 180 or another host in the environment 10.

The defined workflow 136A can be embodied as a structured digital object that provides machine-readable and semantically contextualized information regarding agent objects, agent object behaviors, agent object interactions, and related information. The defined workflow 136A can include several data components. The components of the defined workflow 136A can be defined and organized by the agent designer 120 using the graphical workflow canvas 312 by a user of the client device 180, for example. In the example shown in FIG. 4, the defined workflow 136A includes agent object identifiers 402, a workflow graph structure 404, execution triggers 406, runtime parameters 408, environment context metadata 410, tool invocation instructions 412, feedback signal configurations, and execution policies 416, among possibly other types of data and data constructs. The workflow execution engine 118 is configured to interpret and evaluate the operational logic of the defined workflow 136A and orchestrate the execution of the agent objects according to operational logic.

In the defined workflow 136A, the agent object identifiers 402 specify the callable endpoints of agent objects for ML models that will participate in the runtime execution of the defined workflow 136A. Each identifier uniquely references a registered, callable endpoint for an ML model among those in the model registry 138, an external callable component, or related callable component. The agent object identifiers 402 can also indicate versioning metadata or resource scope of ML models, among other information. The workflow execution engine 118 can reference the agent object identifiers 402 to identify the callable endpoints and other callable components for execution during the runtime execution of the defined workflow 136A.

The workflow graph structure 404 includes a framework for the logically directed execution topology among the agent objects. This framework represents the logical dependencies, execution order, branching conditions, parallelizable paths, and joining points among agent objects, similar to that shown in the graphical workflow canvas 312 in FIG. 2. The workflow graph structure 404 can be constructed from user-defined connections in the graphical workflow canvas 312, which can be serialized into graph representations such as directed acyclic graphs (DAGs), flowcharts, and related frameworks. The workflow execution engine 118 can reference the workflow graph structure 404 to confirm the logical dependencies, execution order, branching conditions, parallelizable paths, and joining points among the agent objects specified among the agent object identifiers 402.

The execution triggers 406 can define the mechanisms that initiate execution of a workflow, an agent object, or another component in the defined workflow 136A. The execution triggers 406 can include time-based schedules (e.g., cron), external signals (e.g., HTTP webhook triggers), user interface events, dependent outputs from upstream agent executions, related triggers, and combinations thereof. The execution triggers 406 can be contextually bound to the agent object identifiers 402 and govern when specific nodes in the graph representation become active. The workflow execution engine 118 can reference the execution triggers 406 to confirm when to initiate execution of a workflow, an agent object, or another component in the defined workflow 136A.

The runtime parameters 408 can include certain input parameters that may be used or needed for the execution of agent objects, such as user-provided values, tokens, thresholds, filtering criteria, domain-specific configuration values, and related data, along with metadata that describes the purpose and timing for the input parameters in some cases. The runtime parameters 408 can be injected into agent containers, passed as part of API payloads, or provided as inputs to agent objects in other ways. The workflow execution engine 118 can orchestrate the injection of the input parameters to the agent objects, agent containers, or other input mechanisms, as needed, according to the runtime parameters 408.

The environment context metadata 410 can define the surrounding execution context in which the defined workflow 136A is to run or execute. The environment context metadata 410 can include runtime identity, access control constraints, tenancy restrictions, and namespace configurations that ensure the workflow executes securely and in the correct logical scope. The workflow execution engine 118 can orchestrate the execution of the defined workflow 136A according to the execution context specified by the environment context metadata 410.

The tool invocation instructions 412 can include a specialized subset of the defined workflow 136A, describing how external services, such as the external model service 190, are to be called. The tool invocation instructions 412 can define the API endpoint, authorization credentials and details, expected inputs, and output mapping strategies for the external model service 190, for example. This enables AI-internal logic workflows of the agent objects deployed by the AI platform 110 to operate in combination with third-party or enterprise AI systems, such as those offered by the external model service 190.

The feedback signal configuration 414 specifies how the AI platform 110 should interpret, collect, store, and transmit execution state data. The feedback signal configuration 414 can define thresholds for error detection, completion conditions, output harvesting mechanisms, and telemetry streaming requirements. The feedback signal configuration 414 can also define the type of feedback that is surfaced to the client device 180 as the workflow execution feedback 420, which is described below.

The execution policies 416 govern the operating characteristics of workflow execution for the defined workflow 136A. The execution policies 416 can address concurrency limits, timeout behaviors, retry logic, failure path branching, and data redaction rules. The execution policies 416 can be enforced in real-time by the workflow execution engine 118 to maintain platform integrity, adhere to service level agreements (SLAs), and govern related aspects of execution.

Overall, the workflow execution engine 118 is configured to act as the runtime orchestrator for the defined workflow 136A. The workflow execution engine 118 can interpret the defined workflow 136A and manage invocation of the agent objects and external tool interfaces identified therein. The workflow execution engine 118 can invoke the callable endpoints for the ML models that are registered in the model registry 138 at the appropriate timing(s), generate and monitor the runtime signal 422 to trigger invocation of the external model service 190 at the appropriate timing(s), and direct the overall flow of execution according to the logical definition provided in the defined workflow 136A. The workflow execution engine 118 can also monitor and store execution state information, such as success or failure attempts, returned outputs, trace logs, and other execution state information. The workflow execution engine 118 can also provide certain execution state information to the client device 180 as the workflow execution feedback 420, as shown in FIG. 4. This enables the client device 180 to monitor the progress of the execution of the defined workflow 136A in a visual or programmatic way, such as on the graphical workflow canvas 312.

During runtime, the workflow execution engine 118 can invoke any number of callable endpoints for agent objects registered in the model registry 138. As needed, the workflow execution engine 118 can also invoke one or more external services hosted by the external model service 190, using defined integrators or external tool interfaces. In some cases, the workflow execution engine 118 can generate and transmit the runtime signal 422 to the external model service 190 as part of execution orchestration. The runtime signal 422 serves as a dynamic communication construct between the external model service 190 and the AI platform 110. The runtime signal 142 enables interaction between internal and external components of the AI platform 110.

In one direction, the runtime signal 422 can function as an invocation mechanism used to trigger the execution of operations by the external model service 190. For example, the workflow execution engine 118 can invoke a third-party API, remote language model, data service, or task automation system hosted by the external model service 190, by sending the runtime signal 422 formatted as a payload consistent with the integration protocol of the external model service 190. In some cases, a single runtime signal 422 can be broadcast or routed to multiple external model service 190 destinations. In other cases, separate runtime signals can be sent to each target external model service 190.

Runtime signals, similar to the runtime signal 422, can also be employed internally within the AI platform 110, for the communication of execution results produced by the execution of callable endpoints for agent objects. In this context, runtime signals in the AI platform 110 can encapsulate prediction outputs, intermediate variables, or tool responses generated during workflow execution. The data within such runtime signals can be collected by the workflow execution engine 118, stored in the data store 130, and used to construct the workflow execution feedback 140, which can be transmitted to the client device 180 for rendering on the GUI 184 or downstream handling. The client device 180 can present the workflow execution feedback 140 through the GUI 184, for example, expose the workflow execution feedback 140 through a client API, or use the workflow execution feedback 140 to drive follow-on user interface behaviors or automated processes. Thus, the runtime signal 422 and other runtime signals in the AI platform 110 can function as bidirectional signals for workflow activation and telemetry, enabling both outbound invocation of services and inbound propagation of execution results within the AI platform 110 and to the client device 180.

Figure 5A:
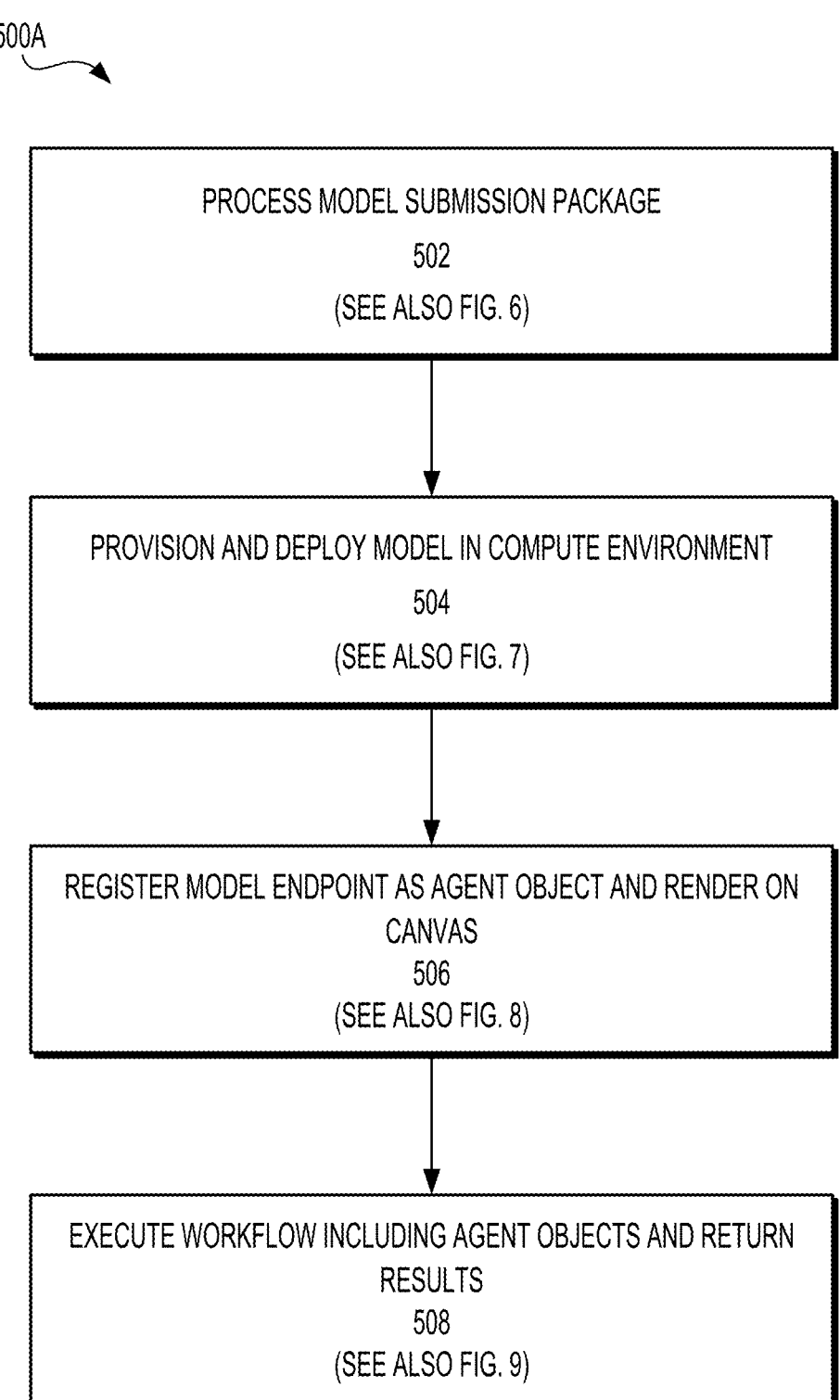
FIG. 5A depicts a method for managing model submission, deployment, registration, and workflow execution according to an example implementation.
Figure 5B:
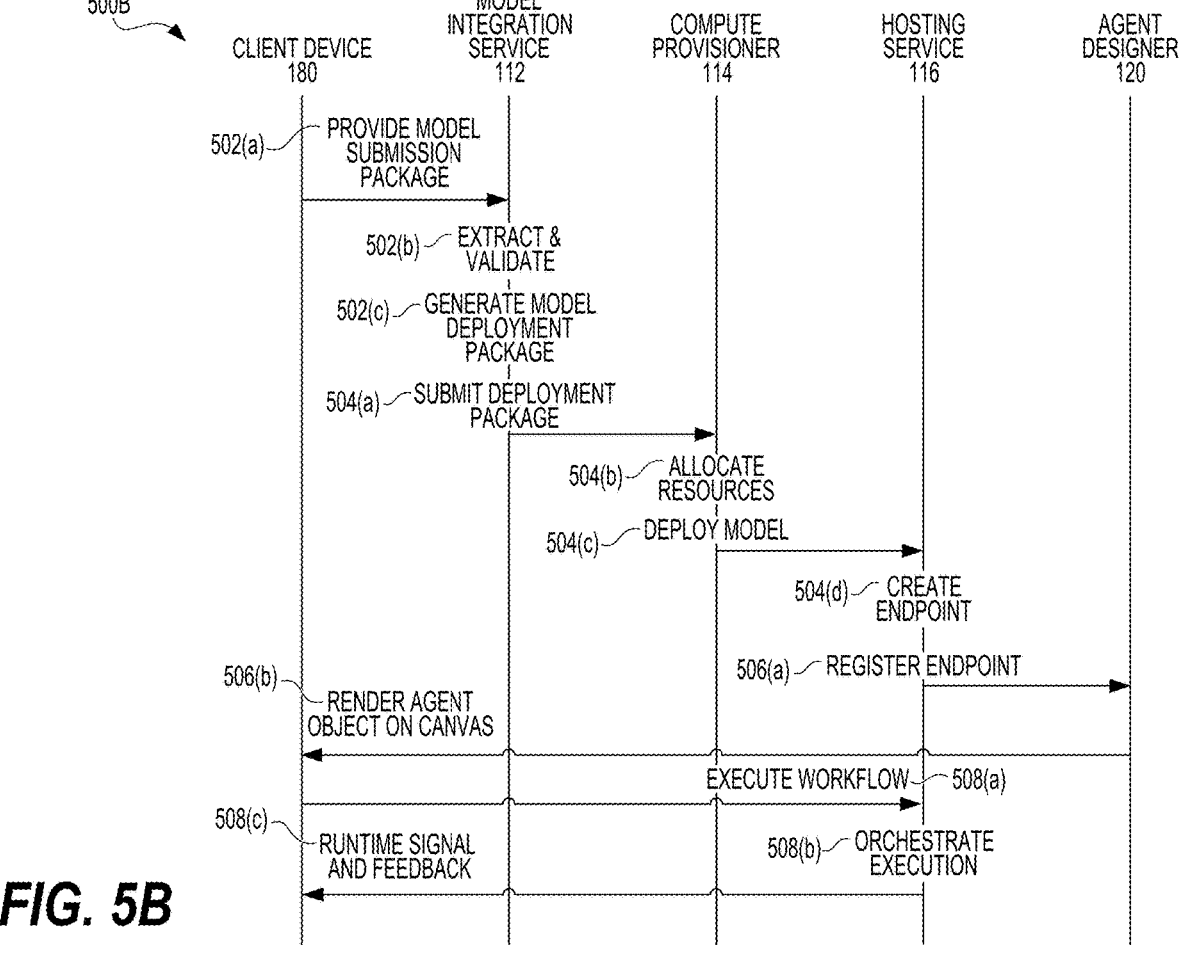
FIG. 5B depicts a sequence diagram illustrating the interactions between system components during execution of the method shown in FIG. 5A.

FIG. 5A depicts a method 500A for managing model submission, deployment, registration, and workflow execution according to an example implementation. FIG. 5B depicts a sequence diagram 500B illustrating the interactions between system components during execution of the method 500A. The method 500A can be performed by one or more computing devices in a computing environment. The method 500A can be performed by the AI platform 110 and other devices in the networked operating environment 10 shown in FIG. 1, as one example, but other computing environments and devices can be relied upon to perform the method 500A. Thus, while the steps of the method 500A are described in connection with the AI platform 110, other computing environments and devices can be relied upon to perform the method 500A.

At block 502, the method 500A includes processing a model submission package. Processing the model submission package at block 502 can include receiving a model submission package, extracting and validating an ML model and related data from the model submission package, and preparing the ML model for deployment. The model integration service 112 can receive the model submission package 132A from the client device 180, for example, over the network 170. Thus, as shown at 502(a) in FIG. 5B, the client device 180 submits a model submission package to the model integration service 112. The model submission package 132A can include, among other components, the ML model 202, the manifest file 204 defining configuration parameters (e.g., compute class, memory allocation, environment variables), the authentication data 206, the auxiliary data 208, and possibly other data. The configuration extractor 210 of the model integration service 112 can extract the data and data types from the model submission package 132A for further processing. This extraction and validation process is illustrated at 502(b) in FIG. 5B.

Processing the model submission package at block 502 can also include validating data extracted from the model submission package 132A. For example, the policy validator 212 of the model integration service 112 can validate the data in the model submission package 132A with reference to certain security policies, deployment governance rules, and dependency checks and enforce compliance rules in connection with those policies.

Processing the model submission package at block 502 can also include generating a model deployment package based on the model submission package. For example, the deployment package generator 214 of the model integration service 112 can generate the model deployment package 134A at block 502. As shown at 502(c) in FIG. 5B, the model integration service 112 generates the model deployment package internally. The model deployment package 134A can include the validated ML model 260, the configuration parameters 262, the deployment metadata 264, and the dependency reference information 266. The model deployment package 134A can then be passed to the compute provisioner 114 for provisioning and deployment.

At block 504, the method 500A includes provisioning and deploying the ML model in a compute environment. FIG. 5B illustrates this process beginning at 504(a), where the model integration service 112 submits the model deployment package to the compute provisioner 114. Provisioning and deploying the model at block 504 can include allocating appropriate computing resources and initiating model deployment based on the previously generated model deployment package. For example, the compute provisioner 114 can receive the model deployment package 134A and evaluate its contents using components such as the resource evaluator 220 and the infrastructure selector 222. These components determine a suitable compute instance, such as a container or virtual machine, based on the configuration parameters 262 (e.g., compute class and memory allocation) and the deployment metadata 264. The resource allocation process is shown at 504(b) in FIG. 5B.

The compute provisioner 114 can also generate provisioning directives used to initialize the selected infrastructure with the appropriate environment variables, authentication data, and dependencies. Once the infrastructure is provisioned, the validated ML model 260 can be deployed into the secure execution environment by the hosting service 116. As illustrated at 504(c) in FIG. 5B, the compute provisioner 114 deploys the model to the hosting service 116. The deployment can also be managed by the runtime integrator 230 and the endpoint generator 232, which creates a callable endpoint for the deployed ML model. The endpoint creation is shown at 504(d) in FIG. 5B. The result of block 504 is a deployed callable model endpoint, or deployed callable endpoint, which can be programmatically invoked and monitored by the AI platform 110.

At block 506, the method 500A includes registering the callable endpoint as an agent object and rendering the agent object on a graphical workflow canvas. FIG. 5B shows this process beginning at 506(a), where the hosting service 116 registers the endpoint with the agent designer 120. Registering the callable endpoint at block 506 can include associating the callable endpoint with metadata and instantiating it as a workflow-accessible component. For example, the registration handler 234 in the hosting service 116 can register the callable endpoint in the model registry 138 and generate the registration message 240 including a unique agent object identifier.

Registration of the callable endpoint in the model registry 138 allows the callable endpoint to be exposed through the agent designer 120 as agent object. The development interface generator 250 in the agent designer 120 can then render the registered, callable endpoint as a deployed agent object 342 in the graphical workflow canvas 312, displayed on the client device 180, as illustrated in the example shown in FIG. 3. This rendering process is depicted at 506(*b*) in FIG. 5B, where the agent designer 120 renders the agent object on the canvas back to the client device 180. A user of the client device 180 can then visually incorporate the deployed model into a broader workflow using drag-and-drop or linking mechanisms within the graphical workflow canvas 312. A user of the client device 180 can also visually construct a defined workflow, such as the defined workflow 136A, by dragging agent objects from the agent designer interface 310 to the graphical workflow canvas 312 and logically linking the agent objects together within the graphical workflow canvas 312.

At block 508, the method 500A includes executing a defined workflow including one or more agent objects and returning feedback results related to the execution. As shown at 508(*a*) in FIG. 5B, the client device 180 initiates workflow execution by sending an execute workflow command to the hosting service 116. Executing the workflow at block 508 can include invoking one or more agent objects corresponding to registered model endpoints in defined workflow, as well as other agent objects (e.g., predefined models, external services) in accordance with a defined workflow structure. For example, the workflow execution engine 118 can receive, or receive a pointer to, the defined workflow 136A, which can include graph structures, triggers, runtime parameters, and tool invocation instructions, and orchestrate execution of the agent objects in the order or logic specified in the defined workflow 136A. The orchestration process is illustrated at 508(*b*) in FIG. 5B.

As the agent objects are executed, runtime signals are generated and returned. For example, the runtime signal 422 may include a prediction result or results, intermediate processing outputs, or decision control signals. The workflow execution engine 118 can communicate the results back to the client device 180, and the results can also be rendered in the agent designer interface 310, as also described above with reference to FIG. 4. This return communication is shown at 508(*c*) in FIG. 5B, where the hosting service 116 transmits the runtime signal and feedback back to the client device 180. The workflow execution engine 118 can also collect the workflow execution feedback 420 and use the workflow execution feedback 420 for performance analysis, error tracking, or adaptive control. The workflow execution feedback 420 can also be stored in the data store 130 as execution metrics associated with callable endpoints, where the workflow execution engine 118 acts as a monitoring component.

Figure 6:
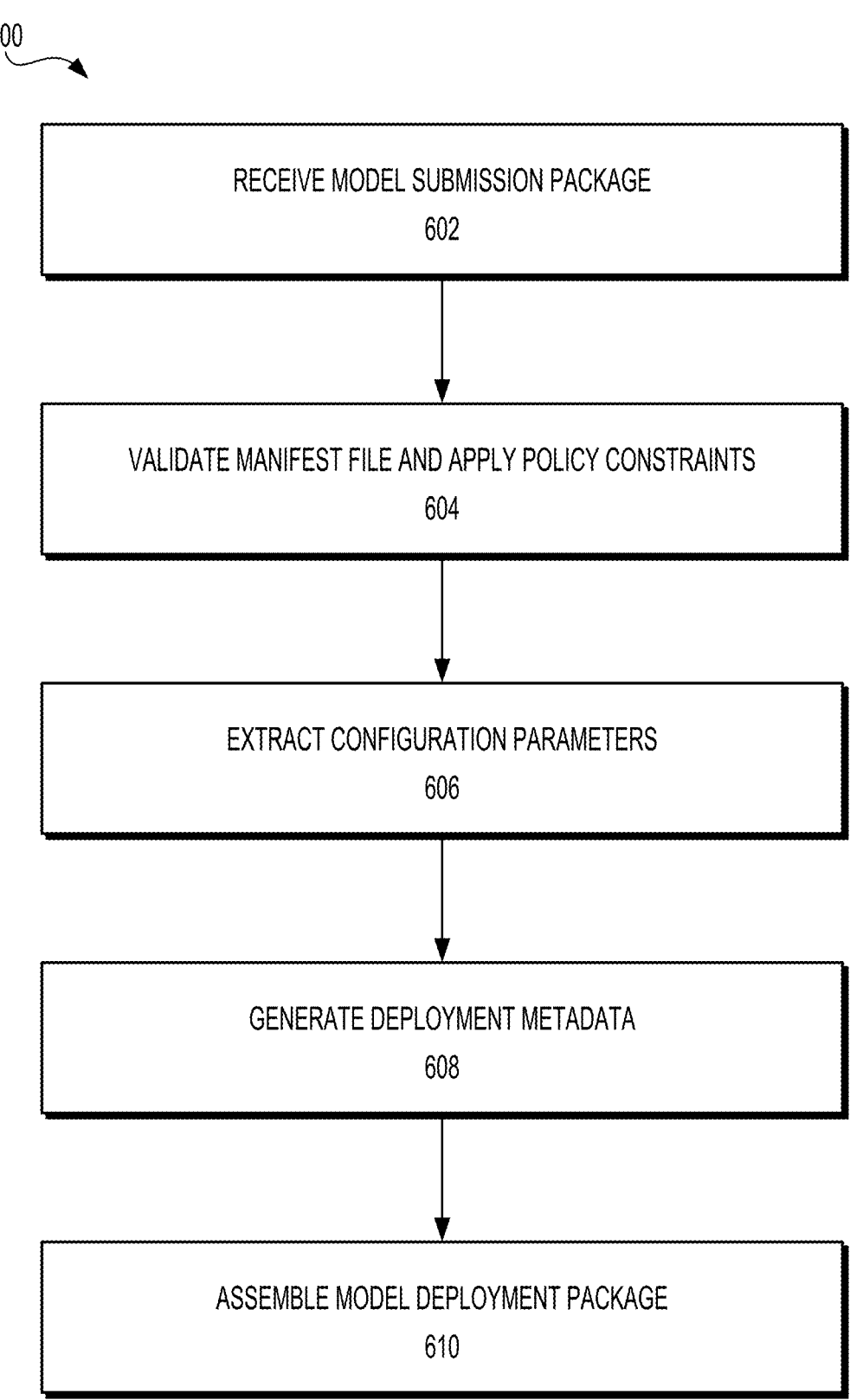
FIG. 6 depicts a method for processing a received model submission package according to an example implementation.

FIG. 6 depicts a method 600 for processing a received model submission package according to an example implementation. The method 600 shown in FIG. 6 is a more expanded definition of block 502 in FIG. 5. At block 602, the method 600 includes receiving a model submission package. For example, the model integration service 112 can receive the model submission package 132A from the client device 180 over the network 170. The model submission package 132A can include the ML model 202, the manifest file 204, the authentication data 206, and the auxiliary data 208.

At block 604, the method 600 includes validating the manifest file and applying policy constraints. Validating the manifest file at block 604 can involve parsing the manifest file and confirming that its configuration parameters conform to predefined platform constraints. For example, the policy validator 212 of the model integration service 112 can check for compliance with deployment governance rules such as authorized compute class definitions, secure permission scopes, acceptable environment variables, and appropriate memory allocations. This validation helps ensure that model execution will occur in a compliant and secure manner.

At block 606, the method 600 includes extracting configuration parameters from the model submission package. Extracting configuration parameters at block 606 can include identifying key values from the validated manifest file 204, such as a compute class, memory allocation, environment variables, authentication credentials, and conditional logic for routing or integration. For example, the configuration extractor 210 of the model integration service 112 can extract the configuration parameters 262 from the manifest file 204. The configuration parameters 262 can be used to determine an appropriate infrastructure for deployment in later stages of the workflow.

At block 608, the method 600 includes generating deployment metadata for the deployment of the ML model described in the model submission package received at block 602. Generating deployment metadata at block 608 can include creating machine-readable descriptors that define how the ML model is to be deployed and accessed. For example, the deployment package generator 214 of the model integration service 112 can generate the deployment metadata 264, and the deployment metadata 264 can specify runtime compatibility details, invocation interface specifications, security annotations, and other details related to the ML model being deployed. The deployment metadata 264 can be useful for downstream services that perform provisioning, registration, and workflow rendering.

At block 610, the method 600 includes assembling a model deployment package. Assembling the model deployment package at block 610 can involve packaging the validated ML model, the extracted configuration parameters, the deployment metadata, and any resolved dependency references into a structured format suitable for deployment. For example, the deployment package generator 214 of the model integration service 112 can assemble the model deployment package 134A, including the validated ML model 260, the configuration parameters 262, the deployment metadata 264, and the dependency reference information 266. The resulting model deployment package 134A can be provided as input for block 504 of the method 500A in FIG. 5.

Figure 7:
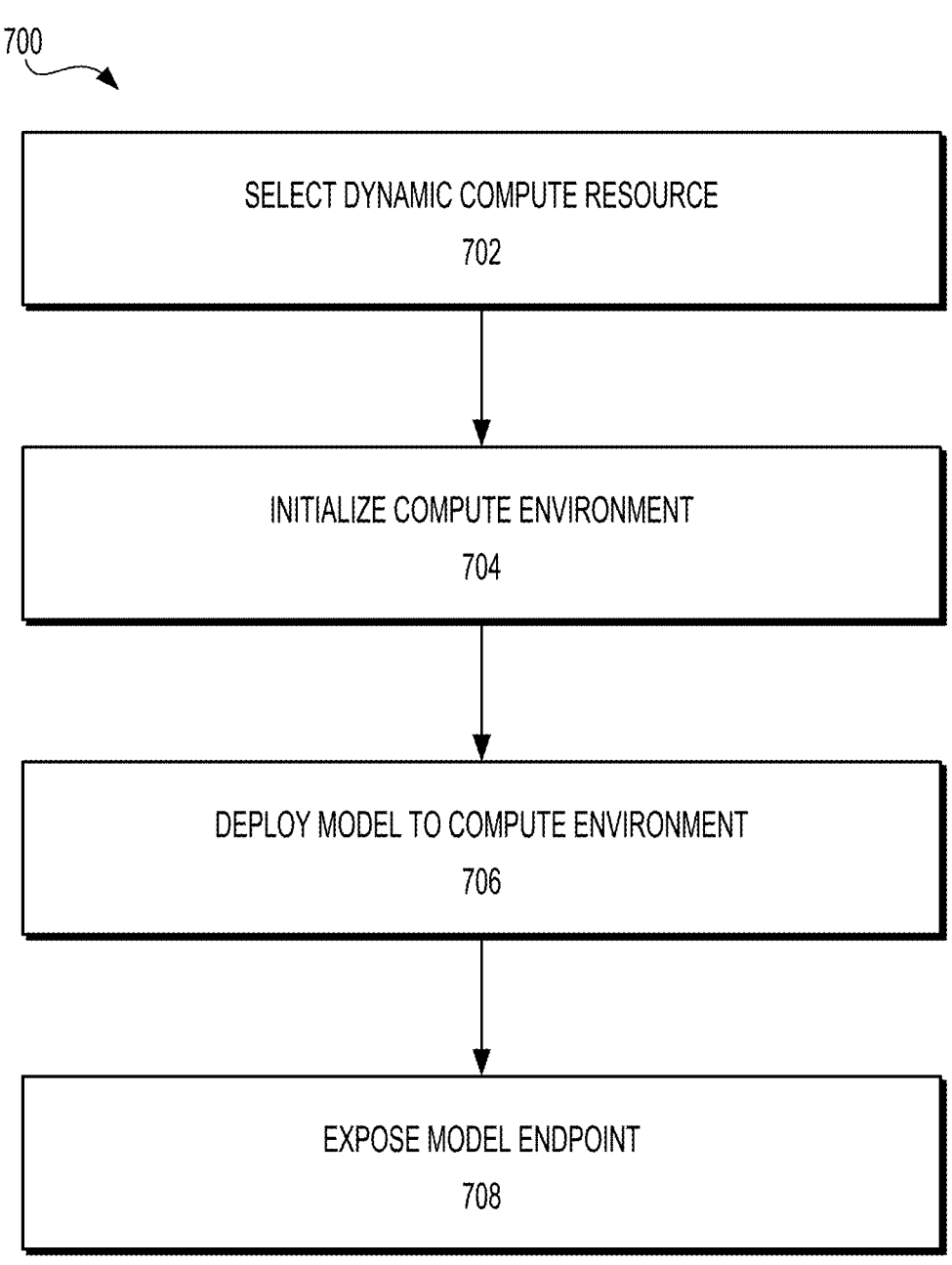
FIG. 7 depicts a method for provisioning infrastructure and deploying a model according to an example implementation.

FIG. 7 depicts a method 700 for provisioning infrastructure and deploying an ML model according to an example implementation. The method 700 shown in FIG. 7 is a more expanded definition of block 504 in FIG. 5. At block 702, the method 700 includes selecting a dynamic compute resource. Selecting a dynamic compute resource at block 702 can include analyzing deployment requirements and identifying a suitable compute environment that satisfies specified configuration parameters, among possibly other steps. For example, the compute provisioner 114 can select a compute environment based on the configuration parameters 262 extracted from the model deployment package 134A. The compute provisioner 114 can evaluate candidate resources using the resource evaluator 220 and determine a compatible infrastructure instance using the infrastructure selector 222. As one example, the compute provisioner 114 can select a dynamic compute resource from a container orchestration cluster managed by the AI platform 110.

At block 704, the method 700 includes initializing a compute environment. Initializing the compute environment at block 704 can include instantiating a container or virtual machine and configuring it with environmental settings, dependencies, and security attributes needed for execution of the model, among possibly other steps. For example, the compute provisioner 114 can initialize a compute environment based on the environment variables and authentication data extracted from the manifest file 204 of the model submission package 132A. The dependency reference information 266 can also be resolved and installed within the environment at block 704.

At block 706, the method 700 includes deploying a model to the compute environment. Deploying the model to the compute environment at block 706 can include transferring the ML model to the provisioned infrastructure, launching the model runtime, and verifying operational readiness, among possibly other steps. For example, the hosting service 116 can deploy the validated ML model 260 to the initialized compute environment and verify that the model is accessible and operating correctly.

At block 708, the method 700 includes exposing a model endpoint. Exposing the model endpoint at block 708 can include generating a callable network interface through which the deployed model can be accessed by external systems or client devices, among possibly other steps. For example, the endpoint generator 232 can create a network-accessible callable endpoint for the deployed ML model and register it with the hosting service 116, the model registry 138, and the agent designer 120, making the deployed ML model available for use in workflows managed by the AI platform 110. Stated differently, the endpoint generator 232 can deploy the callable endpoint behind a private ingress controller and register the callable endpoint within a service mesh of the AI platform 110.

Figure 8:
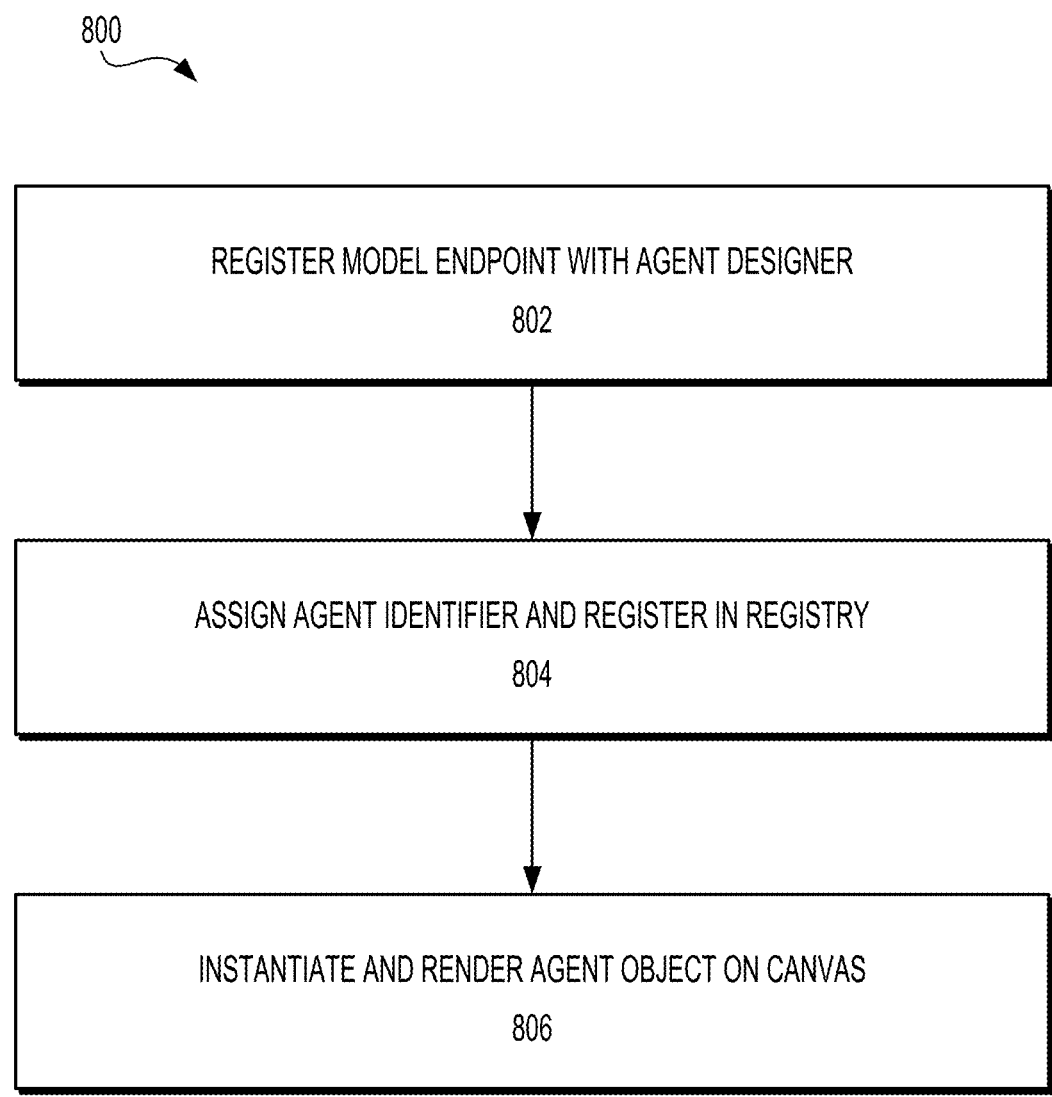
FIG. 8 depicts a method for registering a callable endpoint for a model and rendering it as an agent object according to an example implementation.

FIG. 8 depicts a method 800 for registering a callable endpoint for an ML model and rendering it as an agent object according to an example implementation. The method 800 shown in FIG. 8 is a more expanded definition of block 506 in FIG. 5. At block 802, the method 800 includes registering a callable endpoint for an ML model with an agent designer. Registering the callable endpoint with the agent designer at block 802 can include adding an agent object associated with a callable endpoint in a visual workflow construction environment, preparing the callable endpoint for user interaction, and possibly other steps. For example, the hosting service 116 can register a callable endpoint for the deployed ML model with the agent designer 120. The hosting service 116 can transmit the registration message 240 to the development interface generator 250, which initiates the process of integrating the model endpoint into the design interface.

At block 804, the method 800 includes assigning an agent identifier to the callable endpoint for the deployed ML model and registering the agent identifier agent in a registry. Assigning and registering the agent identifier at block 804 can include generating a unique identifier for the agent object representation of the deployed ML model and storing metadata associated with the agent identifier in a persistent registry, among possibly other steps. For example, the registration handler 234 can assign a globally unique agent object identifier to an agent object for the deployed ML model and store it in a workflow registry, such as the model registry 138. The stored metadata can include the callable endpoint, interface specifications, versioning information, a deployment context, and other specifics associated with the deployed ML model.

At block 806, the method 800 includes instantiating and rendering an agent object on a canvas. Instantiating and rendering the agent object at block 806 can include creating a visual representation of the agent in a user interface and placing it on a graphical workflow canvas for interaction and integration into larger workflows, among possibly other steps. For example, the development interface generator 250 can instantiate the deployed ML model as an agent object 342 and render it on the graphical workflow canvas 312 of the client device 180, as shown in FIG. 4. This enables a user of the client device 180 to visually manipulate the agent object 342 as part of designing or executing AI workflows.

Figure 9:
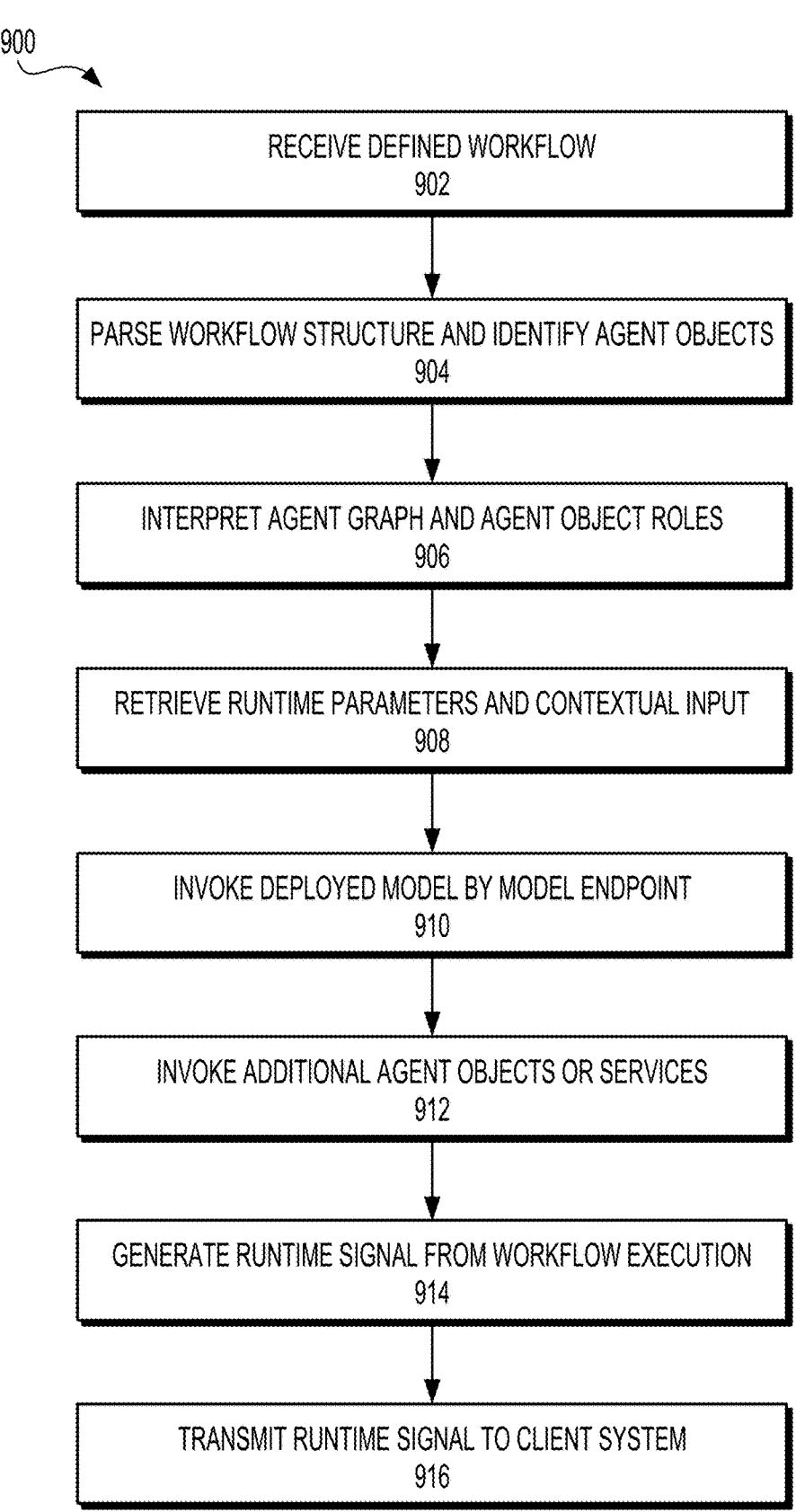
FIG. 9 depicts a method for executing a workflow that includes one or more agent objects according to an example implementation.

FIG. 9 depicts a method 900 for executing a workflow that includes one or more agent objects according to an example implementation. The method 900 shown in FIG. 9 is a more expanded definition of block 508 in FIG. 5. At block 902, the method 900 includes receiving an executable workflow definition, such one of the defined workflows stored in the workflow definitions 136 in the data store 130. Receiving the executable workflow definition at block 902 can include obtaining a representation of a user-defined workflow that describes how a sequence of agent objects and operations should be performed, among possibly other steps. For example, the workflow execution engine 118 can receive the defined workflow 136A from the data store 130 or directly from the client device 180. The defined workflow 136A can be authored using the graphical workflow canvas 312 and includes structures and logic for agent coordination.

At block 904, the method 900 includes parsing a workflow structure of the defined workflow received at block 902 and identifying one or more agent objects in the defined workflow. Parsing the workflow structure and identifying agent objects at block 904 can include traversing the defined workflow 136A, for example, to determine the execution order of agent objects, locating references to individual components, and other steps defined. For example, the workflow execution engine 118 can parse the graph structure defined within the defined workflow 136A to identify the agent objects 342 and 346, among other objects.

At block 906, the method 900 includes interpreting an agent graph and agent object roles. Interpreting the agent graph and agent object roles at block 906 can include analyzing the directed edges and metadata associated with the agent objects to infer their functional roles and execution conditions. For example, the workflow execution engine 118 can determine that the agent object 342 represents a deployed model, while the agent object 346 represents a predefined model (e.g., an LLM).

At block 908, the method 900 includes retrieving runtime parameters and contextual input. Retrieving the runtime parameters and contextual input at block 908 can include acquiring execution-time data and environment-specific values necessary to execute the defined workflow 136A. For example, the workflow execution engine 118 can retrieve the runtime parameters 408 and the environment context metadata 410 from the defined workflow 136A and compare and review them against a central configuration repository, a request payload, or a client-side context.

At block 910, the method 900 includes invoking a deployed model by a callable model endpoint. Invoking the deployed model at block 910 can include sending a formatted request to the exposed callable endpoint of a deployed ML model, among possibly other steps. For example, the workflow execution engine 118 can send an inference request to a callable endpoint for a ML model exposed by the hosting service 116 and registered in the model registry 138.

At block 912, the method 900 includes invoking additional or other agent objects or services. Invoking additional agent objects or services at block 912 can include triggering subsequent workflow steps, such as downstream model agents, validation agents, or utility functions, among possibly other steps. For example, the workflow execution engine 118 can invoke one or more of the external tools 332, one or more of the data sources 334, or other invocations based on the logic and the execution policies 416 in the defined workflow 136A.

At block 914, the method 900 includes generating a runtime signal from workflow execution. Generating the runtime signal at block 914 can include synthesizing the outputs from the workflow into a structured signal for downstream processing or reporting, among possibly other steps. For example, the workflow execution engine 118 can consolidate results into the runtime signal 422 that encapsulates outputs, logs, and decision metadata resulting from the execution path.

At block 916, the method 900 includes transmitting a runtime signal, or data related to the runtime signal, to a client device. Transmitting the runtime signal at block 916 can include sending the final execution output to a client device or interface that initiated the workflow, among possibly other steps. For example, the workflow execution engine 118 can transmit the runtime signal 422 to the client device 180 over the network 170, enabling real-time display or downstream integration by the application 182.

The computing systems in the networked operating environment 10 shown in FIG. 1, such as the computing environment 100, the client device 180, and the external model service 190, can be embodied by one or more computing devices or systems, each of which can be communicatively coupled in the networked operating environment 10 by the network 170 for data communication between them. Certain systems, devices, components, modules, and/or services described herein can be implemented, at least in part, by one or more of the computing devices or systems in the networked operating environment 10.

Examples of the computing devices or systems to implement the computing environment 100, the client device 180, and the external database service 190 include one or more processing units, memory devices, one or more user interface devices, one or more input/output ("I/O") devices, and one or more network devices, each of which can be operatively connected to a system bus. The system bus can enable bi-directional communication between the processing units, the memory, the user interface devices, the I/O devices, the network devices, other components of the computer system, combinations thereof, and the like.

The processing units can implemented as one or more central processing units (CPUs) that performs arithmetic and logical operations, one or more application specific integrated circuits (ASICs), one or more graphics processing unit (GPUs), programmable logic devices (e.g., field-programmable gate array (FPGAs), programmable logic controllers (PLCs), programmable gate arrays, or other types of processors known to those skilled in the art and suitable for controlling the operations of the systems described herein.

The memory devices can be implemented as magnetic disk drives, optical discs and disk drives, magnetic cassettes and tapes, and other magnetic storage devices, solid state memory devices, such as random access memory (RAM), read-only memory (ROM), erasable programmable ROM (EPROM), electrically erasable programmable ROM (EEPROM), flash memory, and other solid memory technologies, and other memory devices and mediums used to store data and executable code. The data stored in the memory devices can be accessed by the processing units over a system bus. The memory can be operatively connected to a memory controller that enables communication with the processing units over the system bus. Among other executable and non-executable data, the memory devices can store an operating system, data, and program modules.

The modules of the computing environment 100, such as those in the AI platform 110, can include software, program, and related modules to perform the various operations described herein. The program modules and/or other programs can be embodied in computer-readable instructions that, when executed by the processing unit, perform various operations such as those described herein. The program modules can also be embodied in hardware, software, firmware, or any combination thereof.

Computer-readable storage media, such as the memory devices described herein, can be embodied as volatile memory, non-volatile memory, removable memory, non-removable memory, and related media devices implemented in any technology format for the storage of data or information, such as computer-readable instructions, data structures, program modules, or other data. The computer-readable storage media include, but are not limited to, RAM, ROM, EPROM, EEPROM, flash memory and other solid state memory technologies, optical, and other optical storage, magnetic cassettes, magnetic tape, magnetic disk storage or other magnetic storage devices, or any other medium which can be used to store data and executable code which can be accessed by the computer system.

The user interface devices can include one or more devices, such as display devices, with which a user accesses the computer system and the program modules. The I/O devices enable a user to interface with the computer system and the program modules. In one embodiment, the I/O devices are operatively connected to an I/O controller that enables communication with the processing unit over the system bus. The I/O devices can include one or more input devices, such as, but not limited to, a keyboard, a mouse, or an electronic stylus. Further, the I/O devices can include one or more output devices, such as, but not limited to, a display screen or a printer.

In some implementations, the computing environment 100 described above with reference to FIG. 1 can be implemented in a cloud computing environment. The cloud computing environment can include a hardware resource layer, a virtualization/control layer, and a virtual resource layer 1106, among possibly other components.

The cloud computing environment can be deployed in a variety of different ways. The deployment options allow users of the AI platform 110, for example, to tailor the operational and control aspects of the AI platform 110 based on privacy, governance, and performance needs and concerns. In a first deployment configuration, the cloud computing environment can be hosted as a multi-tenant public cloud environment by a platform provider, and the AI platform 110 can be hosted entirely within the multitenant public cloud environment as a software-as-a-service (SaaS) offering. In this configuration, all components of the AI platform 110 can be managed in the public cloud environment, and users interact with the AI platform 110 through secure internet-based endpoints. The compute and data storage partitions of the cloud computing environment can be tenant-aware and logically isolated for the AI platform 110 in that case, and user access to the AI platform 110 can be provided through a platform gateway using secure domain routing (e.g., through a domain name service (DNS) such as CloudFlare®).

In a second deployment configuration, the cloud computing environment can be hosted as an off-premises private or dedicated cloud environment, provisioned exclusively for the AI platform 110. Such a dedicated instance retains the architectural structure of the SaaS model but with isolated compute resources. This deployment configuration provides the benefits of managed services while enhancing data residency and isolation. In a third deployment configuration, the cloud computing environment can be hosted using a hybrid model that bridges on-premises or private infrastructure with off-premises remote services hosted by a platform provider. In this scenario, core data and application services may reside within on-premises compute infrastructure, while other platform functions can be hosted and accessed remotely over secure cloud connectors. This deployment option can achieve sovereignty over sensitive data while utilizing cloud-native capabilities, such as scalable compute fabric hosting.

In a fourth deployment configuration, the cloud computing environment can be hosted entirely as an on-premises private or dedicated cloud environment, provisioned exclusively for the AI platform 110. All infrastructure components, AI models, orchestration systems, and developer interfaces are provisioned using the on-premises computer tenancy in that case, providing maximum control over data, infrastructure, and integration. This option supports clients with advanced internal IT operations, heightened compliance obligations, and related concerns. Other deployment configurations and combinations of deployment configurations are also within the scope of the embodiments.

The hardware resource layer of the cloud computing environment can provide hardware resources, such as compute resources, memory resources, and other resources. The compute resources can include one or more hardware components that perform computations to process data, and/or to execute computer-executable instructions of one or more application programs, operating systems, and/or other software. The compute resources can include one or more central processing units (CPUs) configured with one or more processing cores. The compute resources can include one or more graphics processing unit (GPU) configured to accelerate operations performed by one or more CPUs, and/or to perform computations to process data, and/or to execute computer-executable instructions of one or more application programs, operating systems, and/or other software. In some implementations, the compute resources can include one or more discrete GPUs. In some other implementations, the compute resources can include CPU and GPU components that are configured in accordance with a co-processing CPU/GPU computing model, wherein the sequential part of an application executes on the CPU and the computationally intensive part is accelerated by the GPU.

The compute resources can include one or more system-on-chip (SoC) components along with one or more other components, including, for example, one or more of the memory resources, and/or one or more of the other resources. The compute resources can be or can include one or more hardware components architected in accordance with an ARM® architecture. Alternatively, the compute resources can be or can include one or more hardware components architected in accordance with an x86 architecture. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources can include one or more hardware components that perform storage operations, including temporary or permanent storage operations. In some embodiments, the memory resources include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the compute resources.

The other resources can include any other hardware resources that can be utilized by the compute resources, the memory resources, or both to perform operations described herein. The other resources can include one or more input and/or output processors (e.g., network interface controller or wireless radio), one or more modems, one or more codec chipset, one or more pipeline processors, one or more fast Fourier transform (FFT) processors, one or more digital signal processors (DSPs), one or more speech synthesizers, and/or the like.

The hardware resources operating within the hardware resources layer can be virtualized by one or more virtual machine monitors (VMMs) (also known as "hypervisors") operating within the virtualization/control layer to manage one or more virtual resources that reside in the virtual resource layer. The VMMs can be or can include software, firmware, and/or hardware that alone or in combination with other software, firmware, and/or hardware, manages one or more virtual resources operating within the virtual resource layer.

The virtual resources operating within the virtual resource layer can include abstractions of at least a portion of the compute resources, the memory resources, the other resources, or any combination thereof. These abstractions are referred to herein as virtual machines (VMs). Each of the VMs can execute one or more applications.

The flowcharts of FIGS. 5A and 6-9 illustrate the functionality and operation of methods implemented within the environment 10. If embodied in software, each block in these flowcharts may represent a module, segment, or portion of code comprising program instructions to implement the specified logical function(s). The program instructions may be embodied as source code, written in human-readable programming languages such as Python®, Java®, or C++, or as machine code comprising numerical instructions executable by one or more processors. The machine code may be compiled or converted from the source code or other high-level programming languages. If embodied in hardware, each block may represent a circuit or a set of interconnected circuits to implement the specified logical function(s).

Although the flowcharts and sequence diagrams of FIGS. 5A, 5B, and 6-9 depict a specific order of execution, the execution order may vary in alternative implementations. For example, the sequence of execution for two or more blocks may differ or be rearranged relative to the order shown. Additionally, two or more blocks are shown consecutively in FIGS. 5A, 5B, and 6-9 may be executed concurrently or partially concurrently. Furthermore, in some implementations, one or more blocks shown in FIGS. 5A, 5B, and 6-9 may be omitted or skipped entirely. Any such variations, including the addition of counters, state variables, warning semaphores, or troubleshooting messages for enhanced utility, performance measurement, or system monitoring, are understood to fall within the scope of the present disclosure.

Any logic or application described may be embodied in a non-transitory computer-readable medium for use by or in connection with an instruction execution system such as the computer system or the cloud computing environment described above, as examples. In this context, the logic may include instructions and declarations that can be retrieved from the computer-readable medium and executed by the instruction execution system.

The computer-readable medium may include a variety of physical media, such as magnetic, optical, or semiconductor media. Specific examples of suitable computer-readable media include magnetic tapes, magnetic floppy diskettes, magnetic hard drives, memory cards, solid-state drives (SSDs), USB flash drives, and optical discs such as compact discs (CDs) or digital versatile discs (DVDs). The medium may also include random access memory (RAM), such as static random access memory (SRAM) or dynamic random access memory (DRAM), and other volatile memory. Non-volatile memory, such as magnetic random access memory (MRAM), read-only memory (ROM), programmable read-only memory (PROM), erasable programmable read-only memory (EPROM), and electrically erasable programmable read-only memory (EEPROM), are also suitable computer-readable media.

The logic or applications described herein may be implemented and structured in various ways. For instance, one or more modules may be implemented as components of a single application. Alternatively, one or more modules may execute in shared or separate computer systems or as part of a cloud computing environment. For example, multiple modules may execute within the same computer system or across different systems and/or devices connected over the system bus and/or one or more networks, such as the network 170.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

Therefore, the following is claimed:

1. A computer-implemented method for deploying a machine learning model within an artificial intelligence (AI) platform, the method comprising:

receiving a model submission package from a client device over a computer network, the model submission package comprising the machine learning model, authentication data, and a manifest file specifying configuration parameters;

extracting the configuration parameters from the manifest file, the configuration parameters comprising at least memory allocation parameters, compute class parameters, and one or more environment variables;

provisioning a compute environment within the AI platform based at least in part on the configuration parameters, wherein provisioning comprises:

selecting a dynamic compute resource based at least in part on the memory allocation parameters and the compute class parameters; and initializing the compute environment with the environment variables to be set at runtime for the machine learning model and the authentication data for access control validation and policy enforcement for the machine learning model;

deploying the machine learning model to the compute environment;

exposing the machine learning model as a callable endpoint within the AI platform;

registering the callable endpoint with an agent designer interface of the AI platform;

representing, by the agent designer interface, the callable endpoint as an agent object;

instantiating and rendering, by the agent designer interface, the agent object within a graphical workflow canvas of the agent designer interface; and enabling, by the graphical workflow canvas, a user to define an executable workflow comprising the agent object such that the executable workflow is invoked by the AI platform.

2. The computer-implemented method of claim 1, further comprising validating the manifest file for compliance with one or more policy constraints associated with deployment governance.

3. The computer-implemented method of claim 1, wherein provisioning the compute environment comprises selecting the dynamic compute resource from a container orchestration cluster managed by the AI platform.

4. The computer-implemented method of claim 1, wherein exposing the machine learning model as the callable endpoint comprises deploying the callable endpoint behind a private ingress controller and registering the callable endpoint within a service mesh.

5. The computer-implemented method of claim 1, further comprising assigning a unique identifier to the agent object within a workflow registry.

6. The computer-implemented method of claim 1, further comprising receiving a defined workflow comprising a plurality of interconnected agent objects and incorporating the agent object corresponding to the callable endpoint into the defined workflow.

7. The computer-implemented method of claim 6, further comprising executing the defined workflow using a workflow engine configured to invoke the callable endpoint based at least in part on workflow logic.

8. The computer-implemented method of claim 6, wherein the defined workflow comprises a further agent object configured to invoke an external model service.

9. The computer-implemented method of claim 7, further comprising generating a runtime signal comprising a prediction result.

10. The computer-implemented method of claim 9, further comprising transmitting the runtime signal to the client device for rendering on a user interface of the AI platform.

11. The computer-implemented method of claim 1, wherein the manifest file comprises authentication credentials and permission scopes associated with the machine learning model.

12. The computer-implemented method of claim 1, wherein the machine learning model is selected from a set of predefined model classes registered with the AI platform, the set of predefined model classes comprising language models, vision models, structured data models, time series models, recommendation models, tabular models, rule-based models, graph-based models, audio processing models, multimodal models, and embedded hardware models.

13. The computer-implemented method of claim 1, further comprising storing execution metrics associated with the callable endpoint using a monitoring component.

14. The computer-implemented method of claim 1, wherein deploying the machine learning model comprises instantiating the machine learning model within a secure execution context managed by a code executor supporting sandbox isolation.

15. The computer-implemented method of claim 1, further comprising applying a deployment policy using a rule enforcement component prior to provisioning the compute environment.

16. The computer-implemented method of claim 1, further comprising registering, by the agent designer interface, the agent object in a model registry.

17. The computer-implemented method of claim 1, wherein the manifest file comprises conditional routing logic specifying invocation conditions for the callable endpoint based at least in part on received input parameters.

18. The computer-implemented method of claim 1, further comprising storing the executable workflow defined using the graphical workflow canvas in a workflow repository of the AI platform.

19. A system for deploying a machine learning model within an artificial intelligence (AI) platform, the system comprising:

one or more processors; and a memory storing instructions that, when executed by the one or more processors, cause the one or more processors to:

receive a model submission package from a client device over a computer network, the model submission package comprising the machine learning model, authentication data, and a manifest file specifying configuration parameters;

extract the configuration parameters from the manifest file, the configuration parameters comprising at least memory allocation parameters, compute class parameters, and one or more environment variables;

provision a compute environment within the AI platform based at least in part on the configuration parameters, wherein to provision the compute environment, the one or more processors are further caused to:

select a dynamic compute resource based at least in part on the memory allocation parameters and the compute class parameters; and initialize the compute environment with the environment variables to be set at runtime for the machine learning model and the authentication data for access control validation and policy enforcement for the machine learning model;

deploy the machine learning model to the compute environment;

expose the machine learning model as a callable endpoint within the AI platform;

register the callable endpoint with an agent designer interface of the AI platform;

represent, by the agent designer interface, the callable endpoint as an agent object;

instantiate and render, by the agent designer interface, the agent object within a graphical workflow canvas of the agent designer interface; and enable, by the graphical workflow canvas, a user to define an executable workflow comprising the agent object such that the executable workflow is invoked by the AI platform.

20. A non-transitory computer-readable medium storing instructions that, when executed by one or more processors of an artificial intelligence (AI) platform, cause the one or more processors to:

receive a model submission package from a client device over a computer network, the model submission package comprising a machine learning model, authentication data, and a manifest file specifying configuration parameters;

extract the configuration parameters from the manifest file, the configuration parameters comprising at least memory allocation parameters, compute class parameters, and one or more environment variables;

provision a compute environment within the AI platform based at least in part on the configuration parameters, wherein to provision the compute environment, the one or more processors are further caused to:

select a dynamic compute resource based at least in part on the memory allocation parameters and the compute class parameters; and initialize the compute environment with the environment variables to be set at runtime for the machine learning model and the authentication data for access control validation and policy enforcement for the machine learning model;

deploy the machine learning model to the compute environment;

expose the machine learning model as a callable endpoint within the AI platform;

register the callable endpoint with an agent designer interface of the AI platform;

represent, by the agent designer interface, the callable endpoint as an agent object;

instantiate and render, by the agent designer interface, the agent object within a graphical workflow canvas of the agent designer interface; and enable, by the graphical workflow canvas, a user to define an executable workflow comprising the agent object such that the executable workflow is invoked by the AI platform.

* * * * *